(12) United States Patent
O'Connor et al.

(10) Patent No.: US 7,756,194 B1
(45) Date of Patent: Jul. 13, 2010

(54) CIRCUIT AND METHOD FOR DECODING CODE PHASE MODULATED SIGNALS

(75) Inventors: Stephen O'Connor, Lake Oswego, OR (US); Robert Mack, San Jose, CA (US); David Wright, San Diego, CA (US); Ham Prince, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 964 days.

(21) Appl. No.: 11/324,111

(22) Filed: Dec. 30, 2005

Related U.S. Application Data

(60) Provisional application No. 60/733,937, filed on Nov. 4, 2005.

(51) Int. Cl.
*H04B 1/00* (2006.01)

(52) U.S. Cl. .................. 375/150; 375/142; 375/143; 375/151; 375/153; 375/343

(58) Field of Classification Search ......... 375/142–143, 375/150–152, 343
See application file for complete search history.

(56) References Cited

U.S. PATENT DOCUMENTS

| | | | |
|---|---|---|---|
| 3,978,406 A | 8/1976 | Matsumoto et al. |
| 4,032,885 A | 6/1977 | Roth |
| 4,205,302 A | 5/1980 | Godo |
| 4,638,497 A | 1/1987 | Komatsu et al. |
| 4,700,370 A | 10/1987 | Banerjee et al. |
| 4,943,975 A | 7/1990 | Kurihara et al. |
| 5,136,614 A | 8/1992 | Hiramatsu et al. |
| 5,216,693 A | 6/1993 | Nakamura |
| 5,619,501 A | 4/1997 | Tamer et al. |
| 5,862,172 A | 1/1999 | Sugita et al. |
| 5,930,290 A | 7/1999 | Zhou et al. |
| 6,035,177 A | 3/2000 | Moses et al. |
| 6,061,342 A | 5/2000 | Tsubouchi et al. |
| 6,064,695 A | 5/2000 | Raphaeli |
| 6,072,823 A | 6/2000 | Takakusaki |
| 6,115,411 A | 9/2000 | Van Driest |
| 6,115,609 A | 9/2000 | Kim et al. |
| 6,212,219 B1 | 4/2001 | Shou et al. |
| 6,442,191 B1 | 8/2002 | Strong |
| 6,487,238 B1 | 11/2002 | Kamo |
| 6,493,376 B1 | 12/2002 | Harms et al. |
| 6,519,275 B2 | 2/2003 | Callaway et al. |
| 6,584,142 B1 * | 6/2003 | Chen et al. .................. 375/143 |
| 6,594,317 B2 | 7/2003 | Gorday et al. |

(Continued)

OTHER PUBLICATIONS

"WirelessUSB™ LS Theory of Operation", Cypress Semiconductor Corporation, rev. Aug. 19, 2003, 4 pages.

(Continued)

*Primary Examiner*—Curtis B Odom

(57) ABSTRACT

Disclosed is a circuit for decoding code phase modulated (CPM) signals, including a pseudo-noise (PN) code storage device, storing one or more reference PN codes, a peak detector having an output with decoded CPM data, and a correlation block, including a correlation multiplexer, a plurality of shift registers coupled to the correlation multiplexer, a selection circuit coupled to the plurality of shift registers, and a correlator coupled to the code storage device and correlation multiplexer. Also disclosed is a method for operating the circuit in two operating modes for decoding CPM signals.

15 Claims, 17 Drawing Sheets

U.S. PATENT DOCUMENTS

| | | | |
|---|---|---|---|
| 6,727,790 | B2 | 4/2004 | Raphaeli et al. |
| 6,798,825 | B1 | 9/2004 | Horne |
| 6,853,696 | B1 * | 2/2005 | Moser et al. ............... 375/375 |
| 6,876,692 | B2 | 4/2005 | Shi et al. |
| 6,925,105 | B1 | 8/2005 | Partyka |
| 7,092,372 | B1 | 8/2006 | Jensen et al. |
| 7,099,372 | B2 | 8/2006 | Nieczyporowicz et al. |
| 7,177,348 | B2 * | 2/2007 | Yang ......................... 375/152 |
| 7,212,506 | B2 | 5/2007 | Varney et al. |
| 7,280,615 | B2 | 10/2007 | Roberts |
| 7,447,254 | B1 | 11/2008 | Mack et al. |
| 7,463,709 | B2 | 12/2008 | Raphaeli et al. |
| 7,519,101 | B1 | 4/2009 | Wright |
| 2003/0023881 | A1 | 1/2003 | Fitzgibbon et al. |
| 2003/0123408 | A1 * | 7/2003 | Saitou ........................ 370/335 |
| 2003/0128747 | A1 | 7/2003 | Poon et al. |
| 2004/0122881 | A1 * | 6/2004 | Mattos et al. ............... 708/422 |
| 2004/0141525 | A1 | 7/2004 | Bhushan et al. |
| 2004/0234005 | A1 | 11/2004 | Mayrargue |
| 2004/0258131 | A1 | 12/2004 | Margon |
| 2005/0175072 | A1 | 8/2005 | Mack et al. |
| 2006/0166681 | A1 | 7/2006 | Lohbihler |

OTHER PUBLICATIONS

"WirelessUSB™ LS 2.4-GHz DSSS Radio SoC", Cypress Semiconductor Corporation, rev. Aug. 3, 2005, Document 38-16007, CYWUSB6932; CYWUSB6934, 30 pages.

"WirelessUSB™ PRoC™ Flash Programmable MCU + Radio", Cypress Semiconductor Corporation, rev. Aug. 19, 2005, Document 38-16017, Preliminary, CYWUSB6953, 7 pages.

"WirelessUSB™ LR 2.4-GHz DSSS Radio SoC", Cypress Semiconductor Corporation, rev. Aug. 3, 2005, Document 38-16008, CYWUSB6935, 32 pages.

"Atmel, Cypress place WirelessUSB Technology on a Path Toward Open Standardization", Physorg.com; Science, Technology, Physics, Space News, Jun. 28, 2005, 4 pages, downloaded Dec. 8, 2005, http://www.physorg.com/news263.html.

"Atmel Becomes Second-Source Supplier for Cypress's WirelessUSB Technology", Embedded Star™; Embedded Systems and Software Resources, Jun. 29, 2004, 3 pages, downloaded Dec. 8, 2005, http://www.embeddedstar.com/press/content/2004/6/embedded15304.html.

Wright, David, "New 2.4 GHz technology brings simple and affordable wireless connectivity to multipoint-to-point systems", Wireless Design & Development, 2005, 6 pages, downloaded Nov. 8, 2005, http://www.wirelessdesignmag.com/ShowPR.aspx . . . .

"IEEE Standard for Information technology-Telecommunications and information exchange between systems-Local and metropolitan area networks-Specific requirements; Part 15.4: Wireless Medium Access Control (MAC) and Physical Layer (PHY) Specifications for Low-Rate Wireless Personal Area Networks (LR-WPANs)", IEEE Computer Society, 2003, 679 pages.

USPTO Non-Final Rejection for U.S. Appl. No. 11/324,110 dated Mar. 31, 2009; 8 pages.

USPTO Requirement for Restriction/Election for U.S. Appl. No. 11/324,110 dated Feb. 5, 2009, 7 pages USPTO Notice of Allowance for U.S. Appl. No. 10/811,301 dated Jun. 25, 2008; 9 pages.

USPTO Non-Final Rejection for U.S. Appl. No. 10/811,351 dated Jan. 27, 2007: 17 pages.

USPTO Non-Final Rejection for U.S. Appl. No. 10/811,361 dated Jun. 27, 2007, 15 pages.

USPTO Non-Final Reject on for U.S. Appl. No. 10/775,668 dated Sep. 16, 2009; 10 pages.

USPTO Notice of Atiowance for U.S. Appl. No. 10/775,668 dated Mar. 31, 2009; 7 pages.

USPTO Requirement for Restriction/Election for U.S. Appl. No. 10/775,668 dated Feb. 4, 2009; 5 pages.

USPTO Non-Final Rejection for U.S. Appl. No. 10/775,668 dated Jul. 25, 2008; 17 pages.

USPTO Notice of Allowance for U.S. Appl. No. 10/775,668 dated Feb. 7, 2008; 7 pages.

USPTO Final Rejection for U.S. Appl. No. 10/775,668 dated Nov. 21, 2007; 10 pages.

USPTO Non-Final Rejection for U.S. Appl. No. 10/775,668 dated Jun. 11, 2007; 16 pages.

USPTO Nora-Final Refection, U.S. Appl. No. 10/775,668 dated Feb. 7, 2007; 13 pages.

U.S. Appl. No. 11/006,934: "Method and Apparatus for Using Empty Time Slots for Spread Spectrum Encoding," David Wright, filed on Dec. 7, 2004; 13 pages.

USPTO Non-Final Rejection for U.S. Appl. No. 11/006,934 dated Oct. 30, 2007; 10 pages.

USPTO Non-Final Rejection for U.S. Appl. No. 11/008,934 dated Apr. 16, 2008; 16 pages.

USPTO Notice of Allowance for U.S. Appl. No. 11/006,934 dated Nov. 28, 2008; 5 pages.

U.S. Appl. No. 12/403,929: "Method and Apparatus for Using Empty Time Slots for Spread Spectrum Encoding," David Wiight, filed on Mar. 13, 2009; 14 pages.

USPTO Notice of Allowance for U.S. Appl. No. 11/324,110 dated Jan. 28, 2010; 6 pages.

USPTO Final Rejection for U.S. Appl. No. 11/324,110 dated Oct. 22, 2009; 9 pages.

* cited by examiner

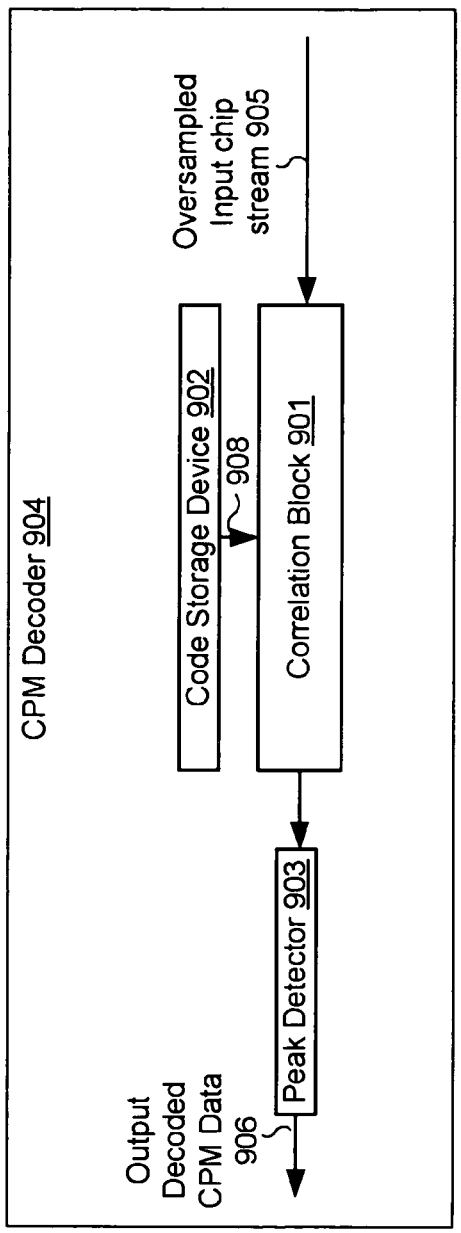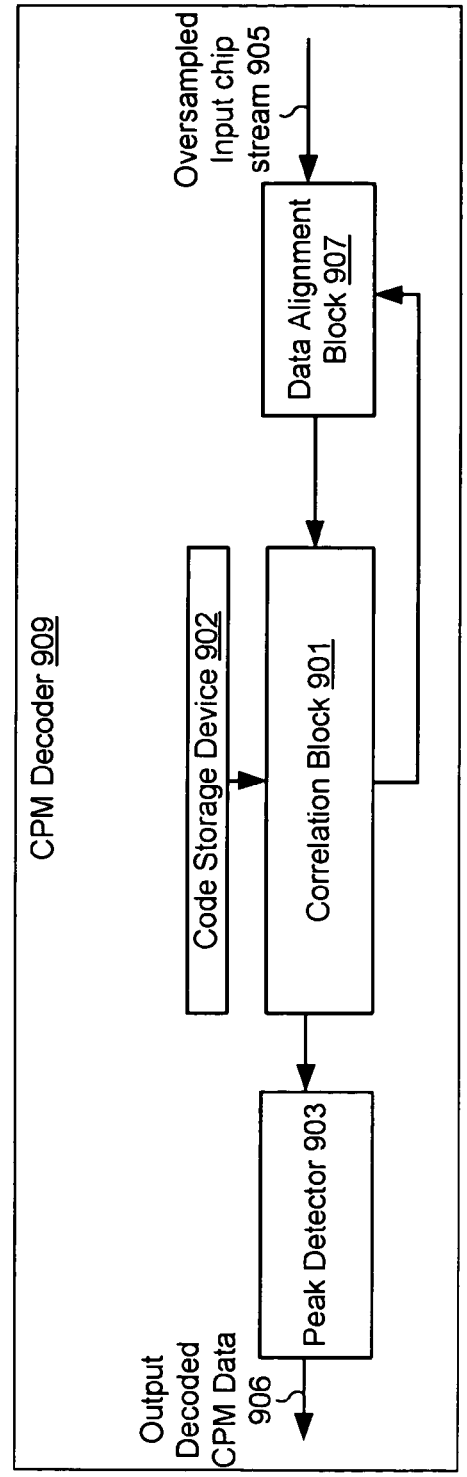
FIG. 9A
FIG. 9B

CIRCUIT AND METHOD FOR DECODING CODE PHASE MODULATED SIGNALS

RELATED APPLICATIONS

This application claims the benefit of U.S. Provisional Application No. 60/733,937, filed Nov. 4, 2005.

TECHNICAL FIELD

The present invention relates generally to electronic circuits and in particular to circuits for wireless communication.

BACKGROUND

Code Position Modulation (CPM) is used as the modulation format for the IEEE 802.15.4 standard, IEEE std. 802.15.4-2003, published Oct. 1, 2003, for low-rate wireless personal area networks (WPAN's), and for Cypress WirelessUSB™ standard. Size, cost, and power consumption are important parameters for devices within these standards. CPM is a variant of Direct Sequence Spread Spectrum (DSSS) modulation, in which data to be transmitted is encoded not as a single PN code sequence, but as one of several bit-shifted derivatives of a single PN code sequence. DSSS generates a redundant bit pattern for each bit to be transmitted. This bit pattern is called a pseudo noise (PN) code. The PN code is a binary signal that is produced at a much higher frequency than the data that is to be transmitted. Because it has a higher frequency, it has a large bandwidth that spreads the signal in the frequency domain (i.e., it spreads its spectrum). The nature of this signal makes it appear that it is random noise. The wide bandwidth provided by the PN code allows the signal power to drop below the noise threshold without losing any information. This allows DSSS signals to operate in noise environments and reduces the interference caused by conventional narrowband signals. The longer the PN code is, the greater the probability that the original data can be recovered.

In CPM, each transmitted symbol is represented by an N-chip PN code (e.g., code sequence or PN code), where k bits of information can be encoded into each symbol by circularly shifting the N-chip PN code to one of $2^k$ positions (where $2^k$ is less than or equal to N).

Conventional implementations of CPM systems have used quadrature phase shift key (QPSK) radio frequency (RF) modulation. In these conventional implementations, the CPM code sequence is encoded in one phase pair of the QPSK, and a clock signal is encoded in the other phase pair. This may allow the receiver to be self-clocking, where a change in phase in the clock phase pair is used to clock in a data chip represented by the phase state of the other phase pair. Binary phase shift key (BPSK) and frequency shift key (FSK) are examples of RF modulation techniques, which are simpler and smaller to implement than QPSK. These modulation techniques also typically allow the design of lower power receiver circuits than receiver circuits implementing QPSK.

Conventional methods for generating the circularly shifted symbol include the use of a look-up table that contains the N-chip PN code sequences for each of the $2^k$ required shifts. This requires a large amount of memory for large values of k. Another conventional method uses a circular shift register and a down-counter. The down-counter is loaded with the shift value, and the shift register is shifted once for each count of the down-counter. When the counter reaches zero, the shift register contains the required symbol. However, down-counters add cost and complexity to the encoder. Another conventional method is specific to PN code sequences, which may be generated from linear feedback shift registers (LSFRs). The CPM encoded PN code sequence is generated by pre-loading an initial state of the LFSR, the initial state being that corresponding to that which would have been present had the LFSR been started in "all 1s" state, and then clocked $2^k$ times.

Conventional solutions that include lookup tables are large, and conventional solutions with circular shift registers require that the code be shifted to its desired state from the last desired state before bit transmission may begin. This requires many clock cycles between the end of transmission of one shifted code, and the next, necessitating the presence of a clock signal that is significantly greater than the shift rate of the PN code. For example, with a 128-chip PN code, it could take up to 64 cycles to shift the register after one code sequence is transmitted, and before the next code sequence is transmitted. Conventional solutions that include the LFSR implementation constrain the PN codes available to members of a small pre-determined set, which are determined by the feedback tap points in the LFSR.

Conventional non-CPM DSSS methods for decoding the circularly shifted symbol include using a correlator to decode the incoming oversampled DSSS signal; however, because CPM encodes most of the date in a bit-shift of the PN code, such a circuit cannot be directly applied to a CPM encoded signal. In order to extract the data encoded in the bit shift, it is necessary to test for a correlation of every possible bit shift of the incoming data in each chip period. Conventional DSSS receivers use a locally generated replica reference PN code (i.e., local code or static code) and a receiver correlator to separate only the desired coded information from all possible signals. The correlator can be thought of as a very special matched filter; it responds only to signal that are encoded with a pseudo noise code that matches its own code. Thus, the correlator can be tuned to different codes simply by changing its local code. This allows the correlator to not respond to man-made, natural, or artificial noise or interference, but only to respond to signals with identical matched signal characteristics and encoded with the identical pseudo noise code. Even if one or more bits in the PN code are damaged during transmission, using a correlator as a statistical technique to extract the original data, the correlator can recover the original data without the need for retransmission. It should be noted that the conventional DSSS receivers devote significant hardware resources to wide, parallel bit-comparisons of samples against the reference code.

BRIEF DESCRIPTION OF THE DRAWINGS

The present invention is illustrated by way of example, and not by way of limitation, in the figures of the accompanying drawings.

FIG. 9A illustrates a block diagram of one embodiment of a CPM decoder including a CPM correlation block for decoding CPM signals.

FIG. 9B illustrates a block diagram of another embodiment of a CPM decoder including a CPM correlation block and a data alignment block for decoding CPM signals.

DETAILED DESCRIPTION

Figure 1:
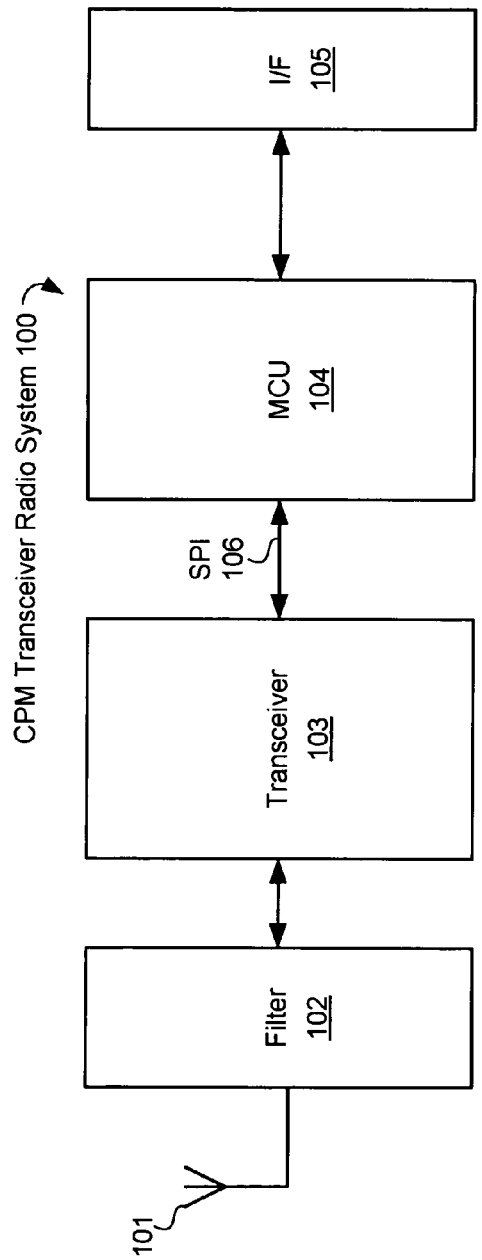
FIG. 1 illustrates a block diagram of one embodiment of a CPM transceiver radio system including a CPM encoder and CPM decoder.

Disclosed herein is a novel approach to implementing a DSSS coding scheme for a wireless system. This approach extends a single PN-code transmitter and receive correlator to use phase alignments of PN codes using efficiently designed hardware. Each N bit code is transmitted at different phase offsets, up to N offsets, affecting a significant increase in data per symbol. This scheme includes three pieces, a transmitter-coding block; a receiver-coding block including a receiver shifter/rotator correlator, which may be configured as a single high frequency oversampling correlator or switched to a code phase mode decoder, decoding all alignments of a code phased symbol while storing incoming code; and a data alignment block, which is configured to receive data centering information based on an initial correlation, and on switching to code phase mode, the sampled data is re-centered to avoid chip boundaries and give more effective sampling rate. This approach may allow the decoding of longer codes (e.g., typically more than 64 chips long) without requiring excessive clock rates and hardware.

In one embodiment, the transmitter-coding block includes a circuit for encoding code phase modulated (CPM) signals, including a code storage device storing one or more reference codes (e.g., PN codes), a counter, and a multiplexer coupled to the code storage device and the counter, the multiplexer to provide an encoded CPM code sequence using the one or more reference codes.

In one exemplary embodiment of a circuit for encoding CPM signals, the data may be encoded as follows: First, a 7-bit data value to be encoded in the position of the code is loaded into the counter that is coupled to the address lines of a multiplexer. The counter is used to control the multiplexer. A 128-bit register, storing a PN code, is coupled to the data inputs of the multiplexer. Next, the counter is clocked 128 times (rolling over if the 7-bit data value is not 0) to generate the 128-chip CPM encoded sequence. For example, if the data value is '0', the sequence output will be $C_0, C_1 \ldots C_{127}$. In another example, if the data value is 99, the sequence output will be $C_{99}, C_{100} \ldots C_{127}, C_0 \ldots C_{98}$. Typically, DSSS systems encode a "1" by sending the PN sequence, and a "0" by transmitting its bit-wise inverse. This can be equally applied to CPM systems, with several bits (7 in the example above) being encoded in the shift position of the sequence, and an additional bit being encoded by inverting or not inverting the resulting sequence of the multiplexer. In this 128-chip PN code example, 8 bits may be encoded using the single 128-chip PN code sequence. That is 8 bits are transmitted in 128 chip periods, so that it takes 16 chip periods to transmit each bit of data, unlike a conventional DSSS transmitter that takes 128 chip periods to transmit a single bit. Alternatively, multiple PN codes may be used to increase the data rate.

In one embodiment, the receiver-coding block includes a circuit for decoding code phase modulated (CPM) signals, including a code storage device storing one or more reference codes (e.g., PN codes), a peak detector having an output with decoded CPM data, and a correlation block, including a correlation multiplexer, a plurality of shift registers coupled to the correlation multiplexer, a selection circuit coupled to the plurality of shift registers, and a correlator coupled to the code storage device and correlation multiplexer.

In one embodiment of a circuit for decoding CPM signals, the circuit may operate in two operating modes—a first operating mode as an oversampling correlator, and a second operating mode as a CPM decoder. The first operating mode include loading incoming oversampled data into multiple shift registers in turn, for example, the first N chips are shifted into a first shift register, the next N chips into a second shift registers, and so on. In one embodiment of the CPM decoder, the second operating mode may include rotating previously loaded data (code) within a first shift register, while loading a second shift register with the incoming oversampled data. Using this method during the arrival time of a code from the air, the previously received loaded data (code) can be fully rotated through all possible rotations and the peak correlation phase extracted.

In one embodiment, the data alignment block includes a shifter, which includes N-bit flip-flops, a control block, sample select circuit, and multiplexer. The shifter receives the input stream using an N MHz oversampling clock. The shifter stores 1 chip length. The control block determines the center of the chip using the correlation match values that are feedback from the correlation values of a first start-of-frame (SOF) symbol or marker, also known as start-of-packet (SOP) marker. In the present embodiments described herein, this marker is used by the data alignment block (e.g., 907) to synchronize the receiver with the incoming chip stream as described and illustrated with respect to FIG. 14. The SOF/SOP may be a conventional non-CPM PN code or sequence, used to synchronize the receiver to the incoming chipstream. The sample select circuit selects one or more samples that are on or adjacent to the center of the chip. The sample select circuit may be used to exclude the samples that are near the chip boundaries. The multiplexer may be used to select either the incoming raw stream for the RF analog circuit unmodified, and the aligned or centered data generated by the data alignment block.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present embodiments. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

FIG. 1 illustrates a block diagram of one embodiment of a CPM transceiver radio system including a CPM encoder and CPM decoder. CPM transceiver radio system 100 includes antenna 101 for receiving/transmitting CPM encoded signals. Antenna 101 is coupled to filter 102. Filter 102 operates to filter incoming transmission data. Filter 102 is coupled to transceiver 103, described in detail below. Transceiver 103 is coupled to microcontroller unit (MCU) 104. MCU 104 may be a single chip, including one or more of a processor, RAM, ROM, clock, and/or input/output (I/O) control unit. MCU 104 is coupled to interface (I/F) 105. In one embodiment, interface 105 may be a universal serial bus (USB) interface. Alternatively, interface 105 may be other interfaces known by those of ordinary skill in the art.

It should be noted that transceiver 103 may be coupled directly to antenna 101 and interface 105 without filter 102 and MCU 104. Alternatively, other components known by those of ordinary skill in the art may be coupled to transceiver 103. Antenna 101, filter 102, MCU 104, and interface 105 are well known by those of ordinary skill in the art. Accordingly, details regarding antenna 101, filter 102, MCU 104, and interface 105 have not be included for ease of discussion and in order to not unnecessarily obscure the present embodiments of transceiver 103.

In one embodiment, CPM transceiver radio system 100 may include a transceiver as described above. Alternatively, CPM transceiver radio system 100 may include either a transmitter or a receiver. The CPM radio system, whether it includes a CPM transceiver, transmitter, or receiver, may be used as a WirelessUSB™ radio. Alternatively, the CPM radio system may be used as other CPM radio systems known by those of ordinary skill in the art.

Figure 2:
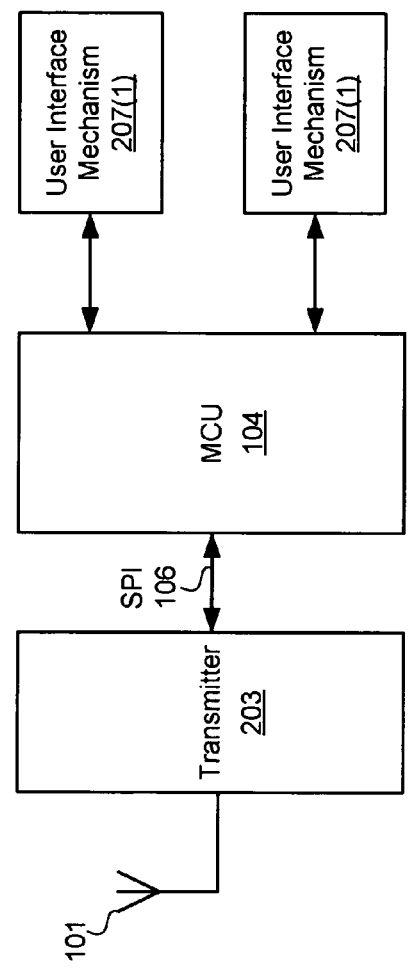
FIG. 2 illustrates a block diagram of one embodiment of a CPM transmitter radio system including a CPM encoder.

FIG. 2 illustrates a block diagram of one embodiment of a CPM transmitter radio system including a CPM encoder. CPM transmitter radio system 200 includes antenna 101 for transmitting CPM encoded signals. Antenna 101 is coupled to transmitter 203, described in detail below. Transmitter 203 is coupled to MCU 104. As previously described, MCU 104 may be a single chip, including one or more of a processor, RAM, ROM, clock, and/or input/output (I/O) control unit. MCU 104 is coupled to one or more user interface mechanisms 207(1)-207(N), where N is a positive integer. In one embodiment, user interface mechanism 207 may be an optical mouse, including an optical mouse sensor and buttons. Alternatively, user interface mechanism 207 may be other user interface mechanisms known by those of ordinary skill in the art.

CPM transceiver, transmitter, and receiver radio systems may be implemented in a System-on-Chip (SOC) integrated circuit (IC). Alternatively, components of the radio systems may be separate chips or integrated circuits. In one exemplary embodiment, the transceiver and/or transmitter may be directly coupled between the serial peripheral interface (SPI) and the antenna. The radio systems may operate with at 2.4 GHz using a Gaussian Frequency Shift Keying (GFSK) modulation scheme. FSK, in general, is a modulation technique that merges binary data into a carrier signal. It creates only two changes in frequency: one for 0, another for 1. Alternatively, other frequencies known by those of ordinary skill in the art may be used, and other modulation techniques known by those of ordinary skill in the art may be used, for example, Binary Phase Shift Keying (BPSK), or Quadrature Phase Shift Keying (QPSK).

CPM transceiver, transmitter, and receiver radio systems may be used in various applications. For example, the CPM transceiver, transmitter, and/or receiver may be used in user interface devices, such as mice, keyboards, and joysticks. Alternatively, they may be used in peripheral gaming devices, such as game controllers, and console keyboards. CPM transceivers, transmitters, and receivers may also be used in applications, such as presenter tools, remote controls, consumer electronics, barcode scanners, point of sale (POS) terminals or peripherals, toys, television remotes and other applications known by those of ordinary skill in the art.

In one exemplary embodiment, transmitter 203 may be used in an optical mouse. User interface mechanism 207 may include an optical mouse sensor and buttons, sending positional data and control data to move a cursor on a display. In one exemplary embodiment, transmitter 203 may operate at 27 MHz, as a transmit-only system, and may not require handshakes to indicate that the data is ready to be transmitted or received.

Figure 3:
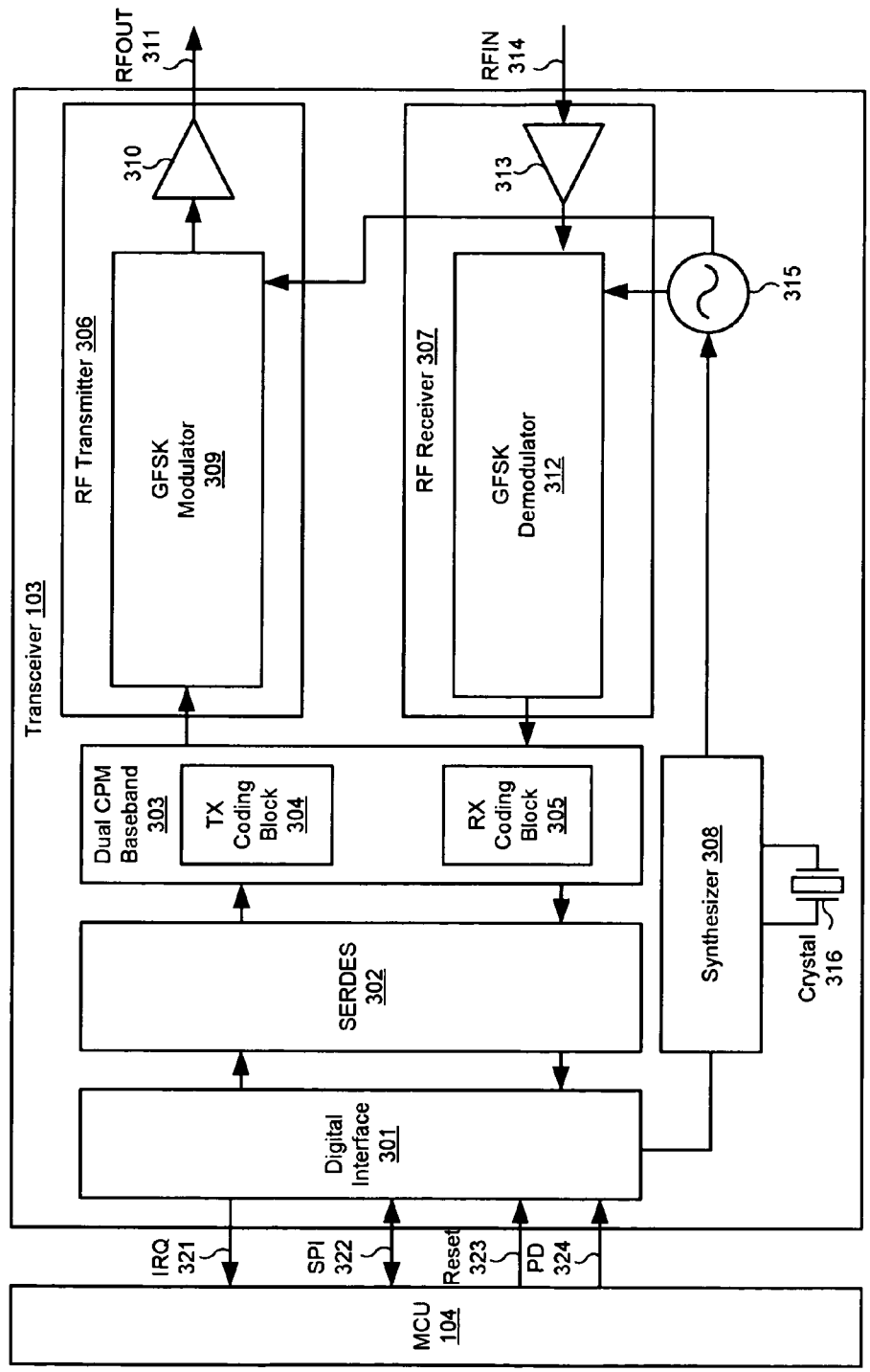
FIG. 3 illustrates a block diagram of one embodiment of the transceiver of FIG. 1 including the CPM encoder and CPM decoder.

FIG. 3 illustrates a block diagram of one embodiment of the transceiver of FIG. 1 including the CPM encoder and CPM decoder. Transceiver 103 includes digital interface 301. Digital interface 301 is coupled to serializer/deserializer (SERDES) 302. SERDES 302 is coupled to dual CPM baseband 303. Dual CPM baseband 303 include transmitter-coding block 304, and receiver-coding block 305. Dual CPM baseband 303 is coupled to radio frequency (RF) transmitter 306, and RF receiver 307. Transceiver 103 also include synthesizer 308. Synthesizer 308 is coupled to digital interface 301 and to voltage-controlled oscillator (VCO) 319. A reference crystal, crystal 316, is coupled to synthesizer 308. Synthesizer 308, VCO 319, and crystal 316 are well known by those of ordinary skill in the art, and accordingly, details regarding them have not been included so as to not obscure the present embodiments of the transmitter- and receiver-coding blocks 304 and 305.

Digital interface 301 interfaces to the application MCU 104. Digital interface may be a fully synchronous SPI slave interface for connectivity to the application MCU 104 via line 322 (e.g., SPI 322). Configuration and byte-oriented data transfer may be performed over this interface. An interrupt on line 321 (e.g., IRQ 321) may be used to trigger real time events. Digital interface 301 may also have an optional bypass mode for applications that require a synchronous serial bit-oriented data path. Digital interface 301 may also receive reset signal 323, and power-down signal 324. Digital interface 301 may provide a SPI communication interface between an application MCU 104 and one or more slave devices. The SPI may support single-byte or multi-byte serial transfers. SPI interfaces are well known by those of ordinary skill in the art. Accordingly, details regarding digital interface 301 and SPI interfaces has not been includes so as to not obscure the present embodiments.

SERDES 302 may be a device that takes parallel data on the receive side, for example, an 8-bit signal, and converts it into a serial chip stream for transmission on a serial link, such as on SPI 322. On the transmission side, SERDES 302 may convert the serial data back to parallel data. SERDES 302 may provide byte-level framing of transmit and receive data. Bytes for transmission are loaded into the SERDES and receive bytes are read from the SERDES via the SPI interface. SERDES 302 may provide a double buffering of transmit and receive data. For example, while one byte is being transmitted by the radio the next byte may be written to a SERDES data register of SERDES 302, insuring no breaks in transmitted data. On the receive side, after a receive byte has been received, it is loaded into the SERDES data register and may be read at any time until the next byte is received, overwriting the contents of the SERDES data register. It should be noted that CPM transmitter radio system 200 would include only a serializer, and not a deserializer. Alternatively, a receive first-in-first-out (FIFO) and transmit FIFO may be used instead of SERDES 302. SERDES, receive and transmit FIFOs are well known by those of ordinary skill in the art, and accordingly, additional details regarding them have not been included so as to not obscure the present embodiments.

In one embodiment, transceiver 103 may include a radio and GFSK modem including GFSK Modulator 309 and Demodulator 312. The radio may include channel matched filters, and amplifiers, such as power amplifier 310 and amplifier 313. Power amplifier allows an output power control range to transmit encoded CPM chip streams via RFOUT line 313. Amplifier 313 may be used to amplify the encoded CPM chip streams received via RFIN line 318. RFOUT and RFIN lines 313 and 318 may be coupled to antenna 101. Alternatively, they may be coupled to separate antennas. Filters may also be used to filter incoming/outgoing signals to remove any interference.

GFSK modulator 309 converts or modulates the chip stream (e.g., CPM data sequences) for example, a 1 MHz chip stream, received from the transmit side of the dual CPM baseband 303 to a GFSK carrier signal, using a carrier frequency received from VCO 315.

GFSK demodulator 312 is coupled to amplifier 313 and the receive side of the dual CPM baseband 303. GFSK demodulator 312 receives an incoming GFSK carrier signal on RFIN line 314, and demodulates the carrier signal into a chip stream (e.g., CPM data sequence(s)). GFSK demodulator 312 may include a fully integrated frequency modulator (FM) detector and data slicer to demodulate the received GFSK signal. The data slicer of GFSK demodulator 312 is coupled to the VCO 315, which provides a frequency signal. VCO 315 is coupled to synthesizer 308. VCO 315, in one embodiment, supplies both frequency signals to GFSK modulator 309 and demodulator 312. Alternatively, multiple VCOs may be used to generate the frequency signals from the synthesizer for the modulator and demodulator.

In alternative embodiments, GFSK modem may be a BPSK modem, QPSK modem, or other modems using other frequency modulation schemes known by those of ordinary skill in the art.

Dual CPM baseband 303 may be configured to convert data into CPM chips by a digital spreader (e.g., transmitter-coding block 304) and to convert CPM chips into data by an oversampled correlator (e.g., receiver-coding block 305). Dual CPM baseband 303 may operate in different operating modes to facilitate accurate transmission in differing noisy environments. For example, a long PN code (e.g., typically over 64 chips long) may be used in the chip stream in order to have a higher probability for recovering packets over the air, or for data transmissions over longer ranges.

In another embodiment, the receive side of the CPM baseband 303 may operate in a complete shift mode (e.g., correlation mode), or alternatively, in a partial shift and partial correlation mode (e.g., CPM decoder mode). The complete shift mode may be used when the receiver-coding block 304 is operating as a shift-register based correlator. The partial shift and partial correlation mode or shift and loop mode may be used to shift in incoming data in some of the shift registers, while correlating (e.g., comparing and rotating the incoming chip PN codes with the reference PN codes) the data of other shift registers. This dual mode operation may allow a clock signal to be effectively reduced in the shift and loop mode by reducing the oversampling rate by half from the oversampling that is used to shift in data in the complete shift mode. These dual modes are described in more detail below, as a first operative, mode as a correlator and a second operative, mode as a CPM decoder.

It should be noted that although the components of transceiver 103 have been illustrated and described together, alternatively, CPM transceiver radio system, including transceiver 103 may be CPM transmitter radio system 200, including only the transmission side of the CPM baseband 303 and RF transmitter 306. Alternatively, the CPM transceiver radio system 100 may include only the receive side of the CPM baseband 303 and the RF receiver 307. Furthermore, additional components known by those of ordinary skill in the art may be used in the CPM radio systems 100 and 200, or components known by those of ordinary skill in the art that have been described with respect to FIGS. 1-3 may not be included in the CPM radio systems 100 and 200.

Figure 4A:
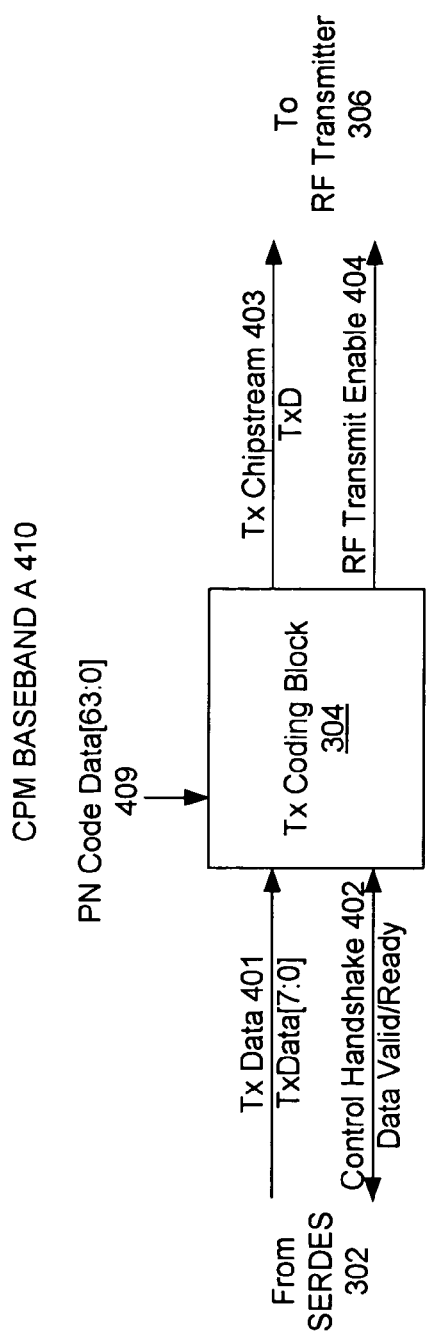
FIG. 4A illustrate a block diagram of one embodiment of a transmitter-coding block.

FIG. 4A illustrate a block diagram of one embodiment of a transmitter-coding block. Transmitter-coding block 304 receives transmission data 401 from SERDES 302, or alternatively from a transmit FIFO. Transmitter-coding block 304 also sends/receives control signals, such as control handshake and data valid/ready signals 402. Alternatively, other control signals known by those of ordinary skill in the art may be used. Transmitter-coding block 304 may receive from an external code storage device, PN code data 409. PN code data 409 may be one or more PN codes. In another embodiment, transmitter-coding block 304 may include a code storage device, which includes the one or more PN codes. Transmitter-coding block 304 transmits or provides a transmission chip stream 403 to RF transmitter 306. In another embodiment, transmitter-coding block 304 may transmit a transmit enable signal 404 to RF transmitter 306. It should be noted in the CPM transmitter radio system 200, transmitter-coding block 304 may transmit only the transmission chip stream 403 at a higher frequency, for example, 27 MHz, without any handshakes or transmission error signals from a corresponding receiver. This may be used in an application that tolerates error in the transmission data transmitted via the RF transmitter 306.

Figure 4B:
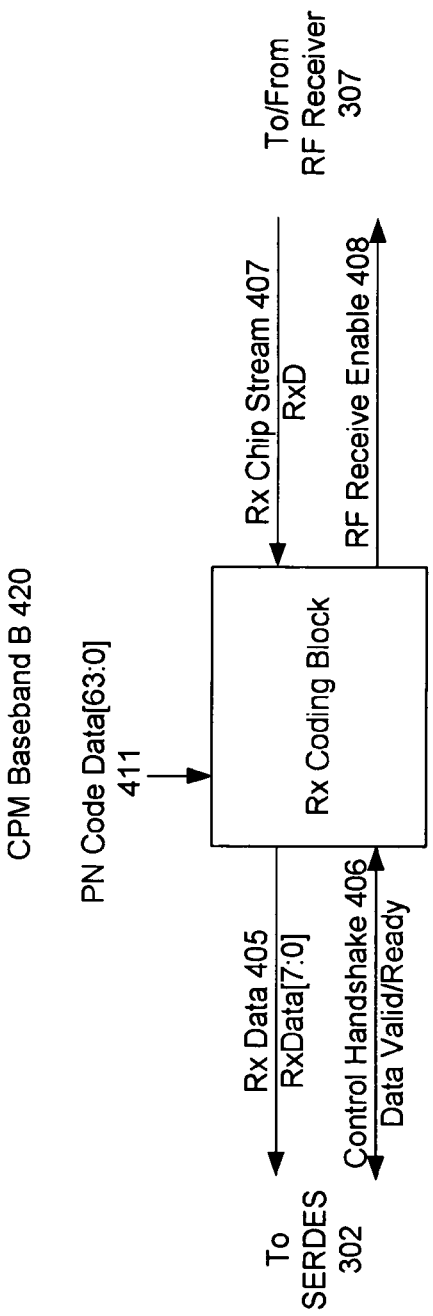
FIG. 4B illustrates a block diagram of one embodiment of a receiver-coding block.

FIG. 4B illustrates a block diagram of one embodiment of a receiver-coding block. Receiver-coding block 305 receives received chip stream 407 from RF receiver 307. Receiver-coding block 305 also sends/receives control signals, such as control handshake and data valid/ready signals 406. Alternatively, other control signals known by those of ordinary skill in the art may be used. Receiver-coding block 305 transmits or provides receive data 405 to SERDES 302, or alternatively to a transmit FIFO. Receiver-coding block 305 may receive from an external code storage device, PN code data 410. PN code data 410 may be one or more PN codes. In another embodiment, receiver-coding block 305 may include a code storage device, which includes the one or more PN codes (e.g., reference codes). In another embodiment, receiver-coding block 305 may transmit a receive enable signal 408 to RF receiver 307.

DSSS encoding is a transmission technique in which a PN code is used as a modulation waveform to "spread" signal energy over a bandwidth much greater than the signal information bandwidth. The PN codes are a sequence of binary numbers called 'chips' having strong auto and cross correlation properties. As previously mentioned, CPM is a variant of DSSS modulation, in which data to be transmitted is encoded not as a single PN sequence, but as one of several bit-shifted derivatives of a single PN sequence. In CPM, each transmitted symbol is represented by an N-chip PN sequence, where k bits of information can be encoded into each symbol by circularly shifting the N-chip PN code sequence to one of $2^k$ positions (where $2^k$ is less than or equal to N).

Figure 4C:
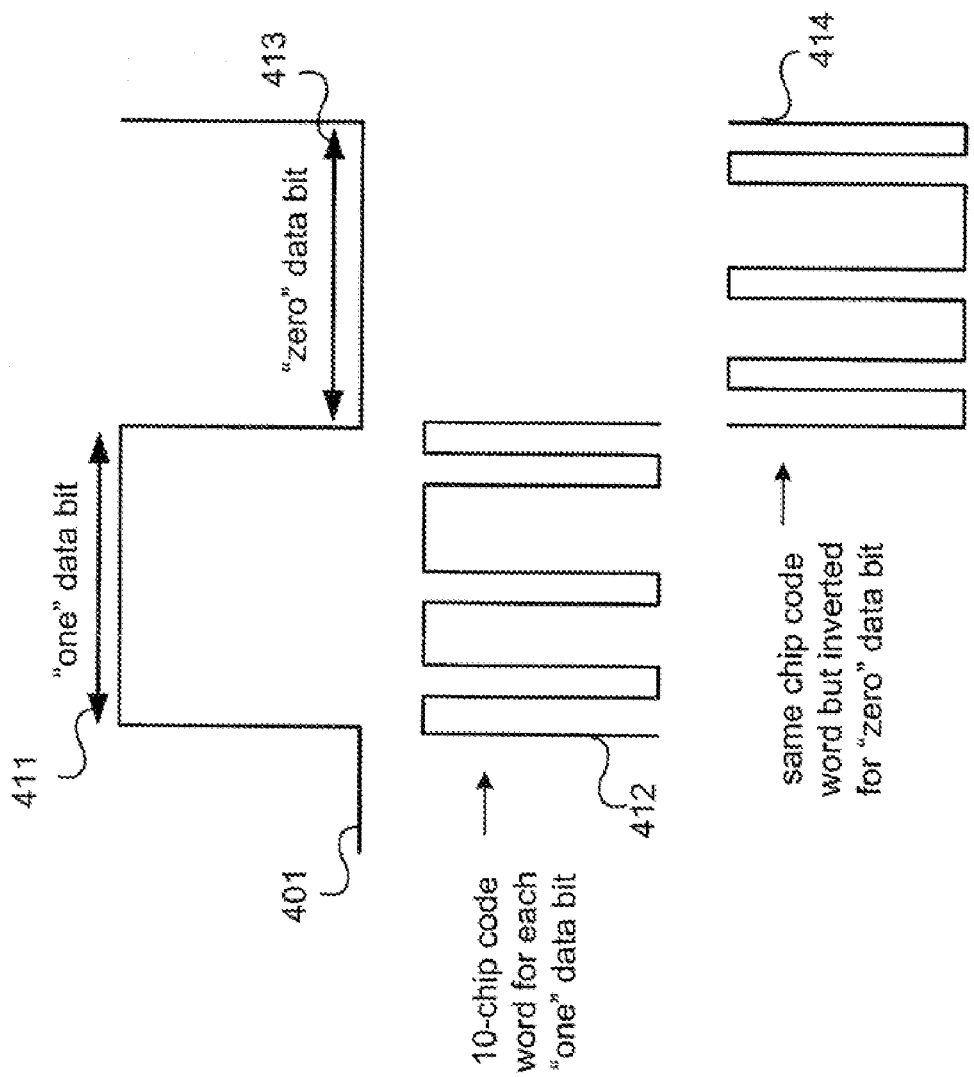
FIG. 4C illustrates one exemplary embodiment of a PN code and its bit-wise inverse for the transmission data.

FIG. 4C illustrates one exemplary embodiment of a PN code and its bit-wise inverse for the transmission data. Transmission data 401 includes one or more data bits, including the values '1' and '0', such as 'one' data bit 411 and 'zero' data bit 413. When transmitting a '1' for transmission data 401, the 'one' data bit 411 may be encoded with a local or reference code to generate encoded codes, such as PN code 412. When transmitting a '0' for transmission data 401, the 'zero' data bit 413 may be encoded with a local or reference code to generate encoded codes, such as PN code 414. PN code 414 is the bit-wise inverse of PN code 412. In this exemplary embodiment, the PN codes 412 and 414 have a chip size of 10.

Figure 5:
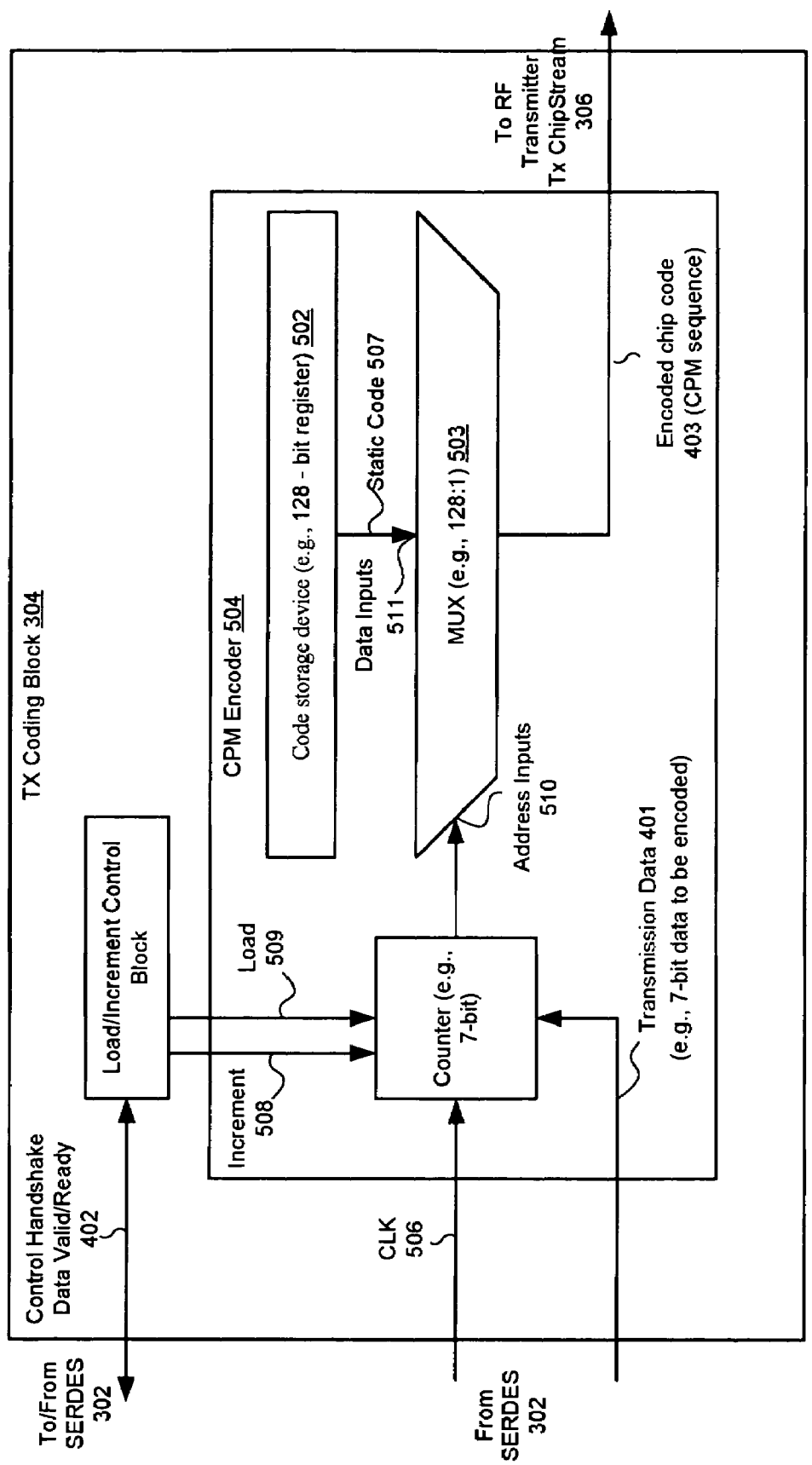
FIG. 5 illustrates a block diagram of one embodiment of a transmitter-coding block including a CPM encoder using a single reference code for encoding CPM signals.

FIG. 5 illustrates a block diagram of one embodiment of a transmitter-coding block including a CPM encoder using a single reference code for encoding CPM signals. Transmitter-coding block 304 includes CPM encoder 504, coupled to load and increment control block 505. Load and increment control block 505 receives and transmits control signals, for example, control handshake, data valid/ready signals 402 to/from SERDES 302 or alternatively, from transmit FIFO. Load and increment control block 505 provide increment signal 508 and load signal 509 to the CPM encoder 504 to load and increment counter 501.

CPM encoder 504 includes counter 501, code storage device 502, and multiplexer (MUX) 503. Counter 501 receives increment and load signals 508 and 509 from load and increment control block 505 to load and/or to increment counter 501. Counter 501 receives transmission data 401 to be encoded into the transmission chip stream with the reference code or codes. Transmission data 401 may be loaded into the counter 501 as an initial counter value using the load signal 509. Counter 501 also receives clock signal 506 from SERDES 302. Alternatively, clock 506 may be provided by other components known by those of ordinary skill in the art.

MUX 503 receives as address line inputs, the output of counter 501. The output of counter 501 may include the initial counter value including the transmission data loaded into the counter 501 received from the SERDES 302 or an incremented counter value generated by the counter 501. MUX 503 receives on data input lines a reference code 507. Reference code 507 (e.g., PN code) is stored in a code storage device 502. MUX 503 provides, as output, an encoded transmission chip stream 403 to RF transmitter 306. Encoded transmission chip stream 403 includes one or more CPM encoded sequences used to transmit the transmission data 401. In one embodiment, chip stream 403 may operate at a frequency of 1 MHz. Alternatively, other chip stream frequencies may be used.

It should be noted that in order to ease the design constrains on the radio front-end of the receiver, there may be run-length (maximum number of consecutive 1s and 0s) and balance (total number of 1s and 0s) constraints on the PN codes (e.g., reference code 507) which cannot be met by standard sequences such as m-sequences, gold codes, etc. Additional details regarding PN codes that may be used are known in the art, and accordingly, have not been included so as to not obscure the discussion of the present embodiments.

In one embodiment, code storage device 502 may be one or more registers. Alternatively, code storage device may be a memory. In one embodiment, the register-based code storage device 502 may include multiple flip-flops that store the one or more PN codes. In one exemplary embodiment of a stand-alone radio integrated circuit (IC), implementing the CPM transmitter, these registers may be loaded by an external processing element such as a microcontroller (e.g., MCU 104). In another exemplary embodiment of an integrated radio and MCU, these registers may be loaded from a table of possible codes stored in program memory.

It should also be noted that although illustrate in FIG. 5 as being inside the CPM encoder 504, code storage device 502 may be located outside the CPM encoder 504, or alternatively, outside the transmitter-coding block 304.

In one exemplary embodiment, a 128-chip PN code may be used as the reference code 507. The PN code to be used is stored in a 128-bit register (e.g., code storage device 502). Counter 501 is a 7-bit counter. The 7-bit counter receives a clock input (e.g., clock 506) and transmission data 401, including 7-bits of data to be encoded into the encoded transmission chip stream 403. The 7-bit counter 501 is loadable with the 7-bit data 401 to be encoded. The output of the counter is coupled to a control input or address input of a 128 to 1 multiplexer (e.g., MUX 503). The parallel input to the 128 to 1 multiplexer 503 is coupled to the 128-bit register 502. The output of MUX 503 (i.e. the selected value) is the CPM encoded code sequence (e.g., encoded PN code 403).

In this exemplary embodiment, transmission data 401 may be encoded using the following operations. In a first operation, the 7-bit data value (e.g., 401) to be encoded in the position of the code is loaded into the counter 501, as an initial counter value. The output of the counter 501 controls the select or address lines of MUX 503. In a second operation, the counter 501 is clocked 128 times to generate the 128-chip CPM encoded sequence at the output of MUX 503. It should be noted that generating the 128-chip CPM encoded sequence may include rolling the counter over if the 7-bit initial counter value is not equal to zero. For example, if the initial counter value is zero, the corresponding CPM sequence output is C0, C1 ... C127. In another example, if the initial counter value is 99, the sequence output will be C99, C100 ... C127, C0 ... C98.

DSSS systems encode a "1" by sending the PN sequence, and a "0" by transmitting its bit-wise inverse. This can be applied to CPM systems, with several bits (7 in the example above) being encoded in the shift position of the sequence, and an additional bit being encoded by inverting or not inverting the resulting CPM sequence. In the 128-chip PN code example described above, 8 bits may therefore be encoded using the single 128-chip PN code sequence.

In one embodiment, the method may include a first operation of loading transmission data value or initial counter value (e.g., transmission data 401) into counter 501. In a second operation, the method includes selecting a phase shift position in a reference code (e.g., a single PN code) using the phase shift select data of the transmission data value (e.g., transmission data 401). The method further includes incrementing the transmission data value or initial counter value in counter 501, in a third operation; and selecting phase shift positions in the reference code (e.g., the single PN code) using the incremented transmission data values of the counter 501, in a fourth operation. Using the phase shift positions of the initial counter value and the incremented counter values an encoded CPM sequence may be generated. The CPM sequence may be transmitted using GFSK. Alternatively, the CPM sequence may be modulated using BPSK, QPSK, or other modulation techniques known by those of ordinary skill in the art.

In one embodiment, incrementing the incremented counter values includes incrementing the counter 501 to provide incremented N-bit data values $2^N$ times, where N is equal to the size of the counter 501. Similarly, selecting phase shift positions includes selecting a phase shift position in the reference code (e.g., reference PN code) using the incremented N-bit data values $2^N$ times. In other words, the counter 501 is clocked $2^N$ times to produce outputs to control the phase shift position of the PN code to be encoded for transmission. If a non-zero value is used as the initial counter value (e.g., transmission data 401), the counter 501 rolls over. For example, if the initial counter value is five and N is equal to 32, then the output of the counter 501 will be C5, C6 ... C31, C0, C1 ... C4.

Figure 6:
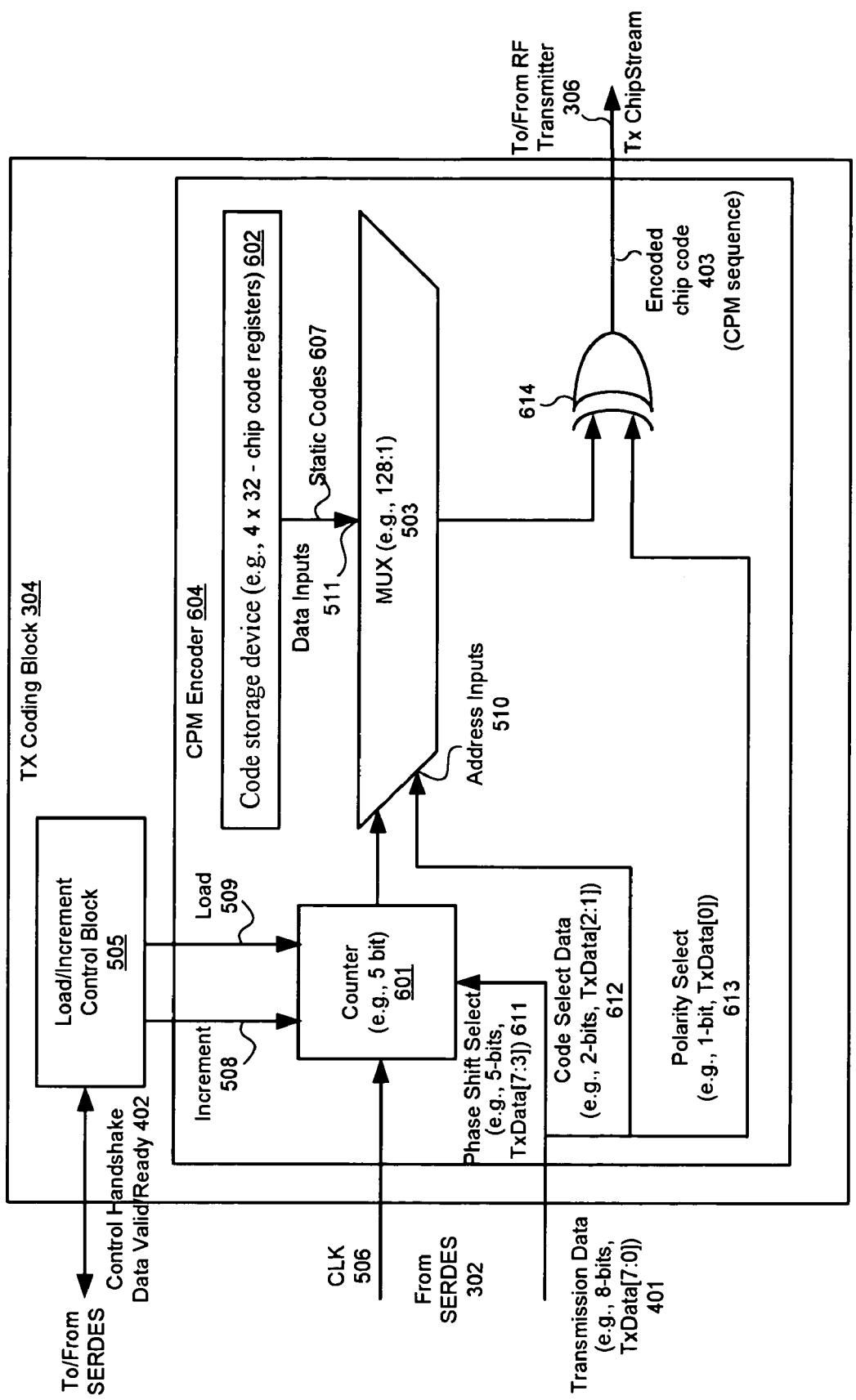
FIG. 6 illustrates a block diagram of another embodiment of a transmitter-coding block including a CPM encoder using a multiple reference codes for encoding CPM signals.

FIG. 6 illustrates a block diagram of another embodiment of a transmitter-coding block including a CPM encoder using multiple reference codes for encoding CPM signals. Transmitter-coding block 304 includes CPM encoder 604, coupled to load and increment control block 505. Load and increment control block 505 receives and transmits control signals, for example, control handshake, data valid/ready signals 402 to/from SERDES 302 or alternatively, from transmit FIFO. Load and increment control block 505 provide increment signal 508 and load signal 509 to the CPM encoder 604 to load and increment counter 601.

CPM encoder 604 includes counter 601, code storage device 602, multiplexer (MUX) 503, and exclusive OR (XOR) gate 614. Counter 601 receives increment and load signals 508 and 509 from load and increment control block 505 to load and/or to increment counter 601. Counter 601 receives transmission data 401 to be encoded into the transmission chip stream with the one or more reference codes. Transmission data 401 may be loaded into the counter 601 as an initial counter value using the load signal 509. Counter 601 also receives clock signal 506 from SERDES 302. Alternatively, clock 506 may be provided by other components known by those of ordinary skill in the art.

MUX 503 receives as address line inputs, the output of counter 601. The output of counter 601 may include the initial counter value including the transmission data loaded into the counter 601 received from the SERDES 302 or an incremented counter value generated by the counter 601. MUX 503 receives on data input lines multiple reference codes 607. Reference codes 607 (e.g., PN codes) are stored in a code storage device 602. MUX 503 provides, as output, an encoded transmission chip stream to XOR gate 614. The output of the XOR gate 614 provides an encoded transmission chip stream 403 to RF transmitter 306. XOR gate 614 encodes encoded transmission chip stream output from MUX 503 with the polarity select data of the transmission data 403. For example, when a data bit value of '1' is in the polarity select data, the chips for the N-chip PN code are output unchanged from XOR gate 614, and for a data bit value of '0', the chips for the N-chip PN code inverts each chip of the N-chip PN code, where N is the chip size of the PN code of code storage device 502. Encoded transmission chip stream 403 includes one or more CPM encoded sequences used to transmit the transmission data 401. In one embodiment, encoded transmission chip stream 403 may operate at a frequency of 1 MHz. Alternatively, other chip stream frequencies may be used.

In one embodiment, code storage device 602 may be one or more registers. Alternatively, code storage device may be a memory. In one embodiment, the register-based code storage device 602 may include multiple flip-flops that store the one or more PN codes. In one exemplary embodiment of a stand-alone radio integrated circuit (IC), implementing the CPM transmitter, these registers may be loaded by an external processing element such as a microcontroller (e.g., MCU 104). In another exemplary embodiment of an integrated radio and MCU, these registers may be loaded from a table of possible codes stored in program memory.

It should also be noted that although illustrate in FIG. 6 as being inside the CPM encoder 604, code storage device 602 may be located outside the CPM encoder 604, or alternatively, outside the transmitter-coding block 304.

DSSS has the advantage of improving signal to noise ratio (SNR), but at the cost of taking a greater time to transmit each bit, as previously described. Thus, in a standard 128-chip DSSS it takes 128 chip periods to transmit a single bit. CPM improves this trade-off. In the example above, 8 bits are transmitted in 128 chip periods, so that it takes 16 chip periods to transmit each bit of data, instead of 128 chip periods.

This trade-off may be improved further by combining CPM with the use of multiple PN codes. In one exemplary embodiment, 32-chip PN codes may be used. As $2^5=32$, 5 bits of data may be encoded using CPM. Using a single PN code, a single bit may be encoded by using both the PN code and its bit-wise inverse. However, using two PN codes, two bits may be encoded, because there are four possible codes, the first PN codes, its bit-wise inverse, the second code, and its bit-wise inverse. Similarly, if four codes are used, 3 bits may be encoded. Therefore, by using four 32-chip PN codes to encode the data, 8 bits (i.e., 5 bits using 32-chip size PN codes and 3 bits using four different PN codes) of data may be transmitted in a 32-chip period which is equivalent to transmitting 1 bit of data in 4 chip periods.

In one exemplary embodiment, four 32-chip PN codes may be used as the reference codes 607. The four PN codes to be used are stored in four 32-bit register (e.g., code storage device 602). Counter 601 is a 5-bit counter. The 5-bit counter receives a clock input (e.g., clock 506), 5-bits of the transmission data 401 (e.g., phase select data value 611) to be encoded into the encoded transmission chip stream 403. The 5-bit counter 601 is loadable with the 5-bit phase shift select data 611 to be encoded. The output of the counter 601 is coupled to a control input or address input lines of a 128 to 1 multiplexer (e.g., MUX 503). MUX 503 also receives on its control input or address input lines 2-bits of the transmission data 401 (e.g., code select data 612) to be encoded into the encoded transmission chip stream 403. Code select data 612 is used to select which PN code of the four PN codes to be used in encoding the transmission data 401. The parallel input to the 128 to 1 multiplexer 503 is coupled to the four 32-bit registers 602. The output of the MUX 503 (i.e. the selected value) is the CPM encoded code sequence (e.g., encoded PN code 403).

In this exemplary embodiment, transmission data 401 includes an 8-bit data byte to be transmitted. The first 5 bits are coupled to a load input of a 5-bit counter 601. The first 5 bits are the phase shift select data 611, used to select the phase shift in the PN code. The next two bits are coupled to a control input of a 128 to 1 MUX 503. The next two bits are the code select data 612, used to select one PN code of the four PN codes of the code storage device 602. The final 1-bit is coupled to an input of an XOR gate 614. The final 1-bit is the polarity select data 613, used to select the polarity of the CPM encoded PN code 403. The 5-bit counter 601 has a clock input (e.g., clock 506) and an output coupled to a control input of the 128-to-1 MUX 503. A block of four 32-chip PN code registers 602 is coupled to an input of the MUX 503. The output of the MUX 503 is coupled to an input of the XOR gate 614. The XOR gate 614 provides, as output, CPM encoded PN code 403.

In this exemplary embodiment, transmission data 401 of may be encoded using the following operations. In a first operation, the 5-bit data value, including the phase shift data 611, to be encoded in the position of the code is loaded into the counter 601, as an initial counter value. The output of the counter 601 controls the select or address lines of MUX 503. In addition, 2-bits of transmission data 401, which include the code select data 612 are provided to the select or address lines of MUX 503. The code select data 612 may be used to select one of the multiple reference codes 607 of the code storage device 602. In a second operation, the counter 601 is clocked 32 times to generate the 32-chip CPM encoded sequence at the output of MUX 503. It should be noted that generating the 32-chip CPM encoded sequence may include rolling the counter over if the 5-bit initial counter value is not equal to zero. For example, if the initial counter value is zero, the corresponding CPM sequence output is C0, C1 ... C31. In another example, if the initial counter value is 28, the sequence output will be C28, C29 ... C31, C0 ... C27. In this exemplary embodiment, 8-bits of data may be transmitted in a 32-chip period, which is equivalent to 1-bit of data in four chip periods.

In an alternative embodiment, counter 601 may be a 7-bit counter to provide all 7-bits of MUX 503 address inputs, with the counter 601 simply being clocked 32 times. Alternatively, the same circuit may be used to encode 32, 64, or 128-chip PN codes, with the code length being determined simply by the number of times that the counter 601 was clocked after the counter 601 had been loaded with the initial counter value, of the transmission data 401.

In one embodiment, the method for generating CPM encoded signals may include a first operation of loading transmission data value or initial counter value (e.g., transmission data 401) into counter 501. In a second operation, the method includes selecting a reference code of a plurality of reference codes (e.g., multiple PN codes) using a code select data value of the transmission data value. In a third operation, the method includes selecting a phase shift position in the selected reference code using the phase shift select data of the transmission data value (e.g., transmission data 401). The method further includes incrementing the transmission data value or initial counter value in counter 501, in a fourth operation; and selecting phase shift positions in the selected reference code (e.g., the single PN code) using the incremented transmission data values of the counter 501, in a fifth operation. Using the phase shift positions of the initial counter value and the incremented counter values an encoded CPM sequence may be generated. The CPM sequence may be transmitted using GFSK. Alternatively, the CPM sequence may be modulated using BPSK, QPSK, or other modulation techniques known by those of ordinary skill in the art.

In one embodiment, incrementing the incremented counter values includes incrementing the counter 601 to provide incremented N-bit data values 2 times, where N is equal to the size of the counter 601. Similarly, selecting phase shift positions includes selecting a phase shift position in the selected reference code using the incremented N-bit data values $2^N$ times. In other words, the counter 601 is clocked $2^N$ times to produce outputs to control the phase shift position of the selected reference code (e.g., reference PN code) to be encoded for transmission. If a non-zero value is used as the initial counter value (e.g., transmission data value), the counter 601 rolls over. For example, if the initial counter value is five and N is equal to 32, then the output of the counter 601 will be C5, C6 ... C31, C0, C1 ... C4.

In one embodiment, for shorter codes (e.g., typically up to 64 chips long), using registers may be the most efficient way to store PN codes. However, as the length of the code increases, a memory (e.g., RAM, ROM, flash, etc) may be a more efficient way to store the PN codes.

Figure 7:
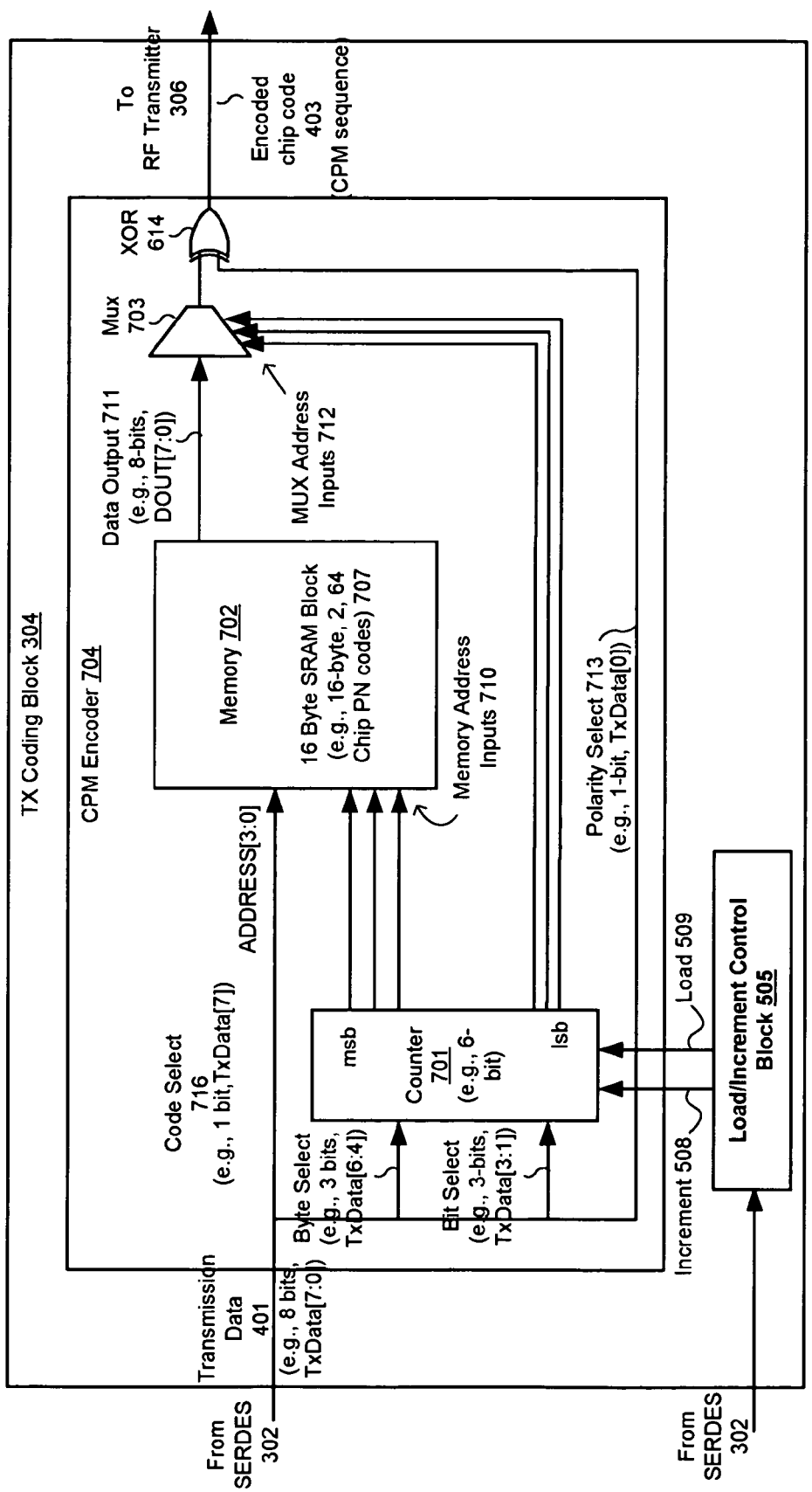
FIG. 7 illustrates a block diagram of one embodiment of a transmitter-coding block of a transmitter including a CPM encoder using a memory to store one or more reference codes for encoding CPM signals.

FIG. 7 illustrates a block diagram of one embodiment of a transmitter-coding block of a transmitter including a CPM encoder using a memory to store one or more reference codes for encoding CPM signals. Transmitter-coding block 304 includes CPM encoder 704, coupled to load and increment control block 505. Load and increment control block 505 may receive and transmit control signals, for example, control handshake and data valid/ready signals 402 to/from SERDES 302 or alternatively, from a transmit FIFO. Load and increment control block 505 provide increment signal 508 and load signal 509 to the CPM encoder 704 to load and increment counter 702. Alternatively, transmitter-coding block 304, including CPM encoder 704 may be used in CPM transmitter radio, and may not require any handshakes or control signals from SERDES 302. In one embodiment, the CPM encoder 704 may operate at 27 MHz, without any handshakes or transmission error signals from a corresponding receiver. This may be used in an application that tolerates error in the transmission data transmitted via the RF transmitter 306.

CPM encoder 704 includes counter 702, memory 702 as a code storage device, multiplexer (MUX) 703, and XOR gate 614. Counter 701 receives increment and load signals 508 and 509 from load and increment control block 505 to load and/or to increment counter 701. Counter 701 receives transmission data 401 to be encoded into the transmission chip stream with the one or more reference codes 707. Transmission data 401 may be loaded into the counter 701 as an initial counter value using the load signal 509. Counter 701 also receives clock signal 506 from SERDES 302. Alternatively, clock 506 may be provided by other components known by those of ordinary skill in the art.

MUX 703 receives as address line inputs, the output of counter 701. The output of counter 701 may include the initial counter value including the transmission data loaded into the counter 701 received from the SERDES 302 or an incremented counter value generated by the counter 701. MUX 503 receives on data input lines the output data of memory 702, including multiple reference codes 707. Reference codes 707 (e.g., PN codes) are stored in memory 702 (e.g., code storage device). MUX 703 provides, as output, an encoded transmission chip stream to exclusive OR (XOR) gate 614. The output of the XOR gate 614 provides an encoded transmission chip stream 403 to RF transmitter 306. XOR gate 614 encodes encoded transmission chip stream output from MUX 503 with the polarity select data of the transmission data 403. For example, when a data bit value of '1' is in the polarity select data, the chips for the N-chip PN code are output unchanged from XOR gate 614, and for a data bit value of '0', the chips for the N-chip PN code inverts each chip of the N-chip PN code, where N is the chip size of the PN code of code storage device 502. Encoded transmission chip stream 403 includes one or more CPM encoded sequences used to transmit the transmission data 401. In one embodiment, encoded transmission chip stream 403 may operate at a frequency of 1 MHz. In another embodiment, encoded transmission chip stream 403 may operate at a frequency of 27 MHz. Alternatively, other chip stream frequencies may be used.

In one embodiment, the register-based code storage device 702 may include multiple flip-flops that store the one or more PN codes. In one exemplary embodiment of a stand-alone radio integrated circuit (IC), implementing the CPM transmitter, memory 702 may be loaded by an external processing element such as a microcontroller (e.g., MCU 104). In another exemplary embodiment of an integrated radio and MCU, memory 702 may be loaded from a table of possible codes stored in program memory. For example, program memory may be a SRAM type memory or a FLASH programmable memory and may include program memory or program/data memory. In one embodiment, the codes may be stored in a portion of the processor's data or program memory that is dual purposed. Alternatively, the codes may be stored in the program memory using other techniques known by those of ordinary skill in the art.

In one exemplary embodiment, memory 702 is a 16-byte reference random access memory (SRAM) block containing two 64-chip PN codes, and counter 701 is a 6-bit counter. In this embodiment, the 6-bit counter receives 6-bits of the 8-bit transmission data 401. Three bits of the 6-bits, byte select data 714, are used to select which byte of the SRAM 702 to use, and the other three bits of the 6-bits, bit select data 715, are used to select which bit of the selected byte to use. The other 2-bits of the transmission data 401 include 1-bit for the code select data 716 to be received by memory 702 to select which of the two 64-chip PN codes of memory 702 to use, and 1-bit for the polarity select data 713 to be received by the XOR gate 614 to select the polarity of the encoded transmission chip stream 403. In this embodiment, memory 702 receives three MSB outputs of the counter 701 and code select data 716 of transmission data 401 on memory address inputs 710. Memory 702 provides data outputs 711 to the data inputs of MUX 703. MUX 703 receives the three LSB outputs of the counter 701 on the mux address inputs 712 of MUX 703. MUX 703 provides an encoded transmission chip stream to XOR gate 614. XOR gate 614 provides encoded PN code 403, including the CPM code sequence, to RF transmitter 306.

It should also be noted that although illustrate in FIG. 7 as being inside the CPM encoder 704, code storage device, memory 702, may be located outside the CPM encoder 704, or alternatively, outside the transmitter-coding block 304.

In this exemplary embodiment, transmission data 401 of may be encoded using the following operations. In a first operation, the 6-bit data value, including the byte select data 714 and bit select data 715, to be encoded in the position of the code is loaded into the counter 701, as an initial counter value. The output of the counter 701 controls mux address lines 712 of MUX 703 and the memory address inputs 710. In addition, 2-bits of transmission data 401, which include the code select data 716 are provided to the memory address lines 710 of memory 702 and polarity select data 713 to the input of XOR gate 614. The code select data 716 may be used to select one of the multiple reference codes 607 of the code storage device 602 (e.g., one of the two PN codes in the exemplary embodiment above). In a second operation, the counter 701 is clocked 64 times to generate the 64-chip CPM encoded sequence at the output of MUX 703. It should be noted that generating the 64-chip CPM encoded sequence may include rolling the counter over if the 6-bit initial counter value is not equal to zero. For example, if the initial counter value is zero, the corresponding CPM sequence output is C0, C1 . . . C63. In another example, if the initial counter value is 36, the sequence output will be C36, C37 . . . C63, C0 . . . C35. In this exemplary embodiment, 8-bits of data may be transmitted in a 624-chip period, which is equivalent to 1-bit of data in eight chip periods.

In one embodiment, the improved method and circuit may be adapted to read the one or more PN codes from RAM as a code storage device (e.g., memory 702). In one exemplary embodiment, a 16 address×16 bit words SRAM may be used. In one embodiment, a 16:1 MUX and a 4-bit address decoder are used, together with the 8-bit counter. The four most significant bits (MSB) of the counter output are used to set the RAM address, and the four least significant bits (LSB) of the counter are used to set the MUX address.

In another exemplary embodiment, a 16×16 dynamic RAM (DRAM) may be used as a code storage device (e.g., memory 702). In this embodiment, an 8-bit counter is coupled to the DRAM. If the DRAM has an ×1 structure, with a 4-bit row address strobe (RAS) and a 4-bit column address strobe (CAS). The improved method and circuit may be implemented by connecting four MSB outputs of the counter to the DRAM CAS inputs, and the four LSB outputs of the counter to the DRAM RAS inputs. In this embodiment, there is no multiplexer on the output of DRAM. The output of the DRAM may output the encoded transmission chip stream 403. It should be noted that although SRAM and DRAM have been described for memory 702, alternatively, memory 702 may be other memory architectures known by those of ordinary skill in the art.

Advantages of the embodiments described herein with respect to transmitter-coding block 304 may include decreasing the size of transmitter-coding block circuitry, increasing a data transfer rate of the CPM sequence, and improving a signal-to-noise (SNR) ratio in transmitting the CPM sequence.

Figure 8A:
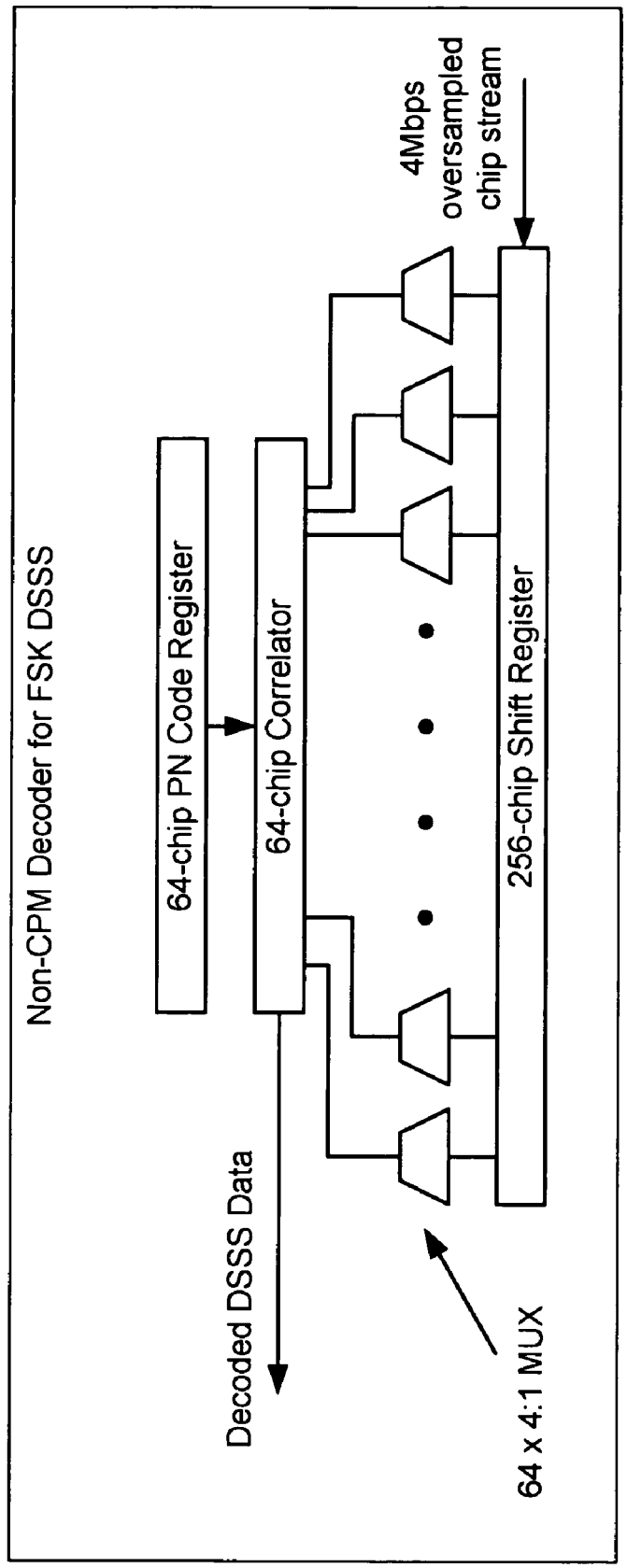
FIG. 8A illustrates a block diagram of a conventional non-CPM direct sequence spread spectrum (DSSS) decoder using a correlator to decode an incoming oversampled DSSS signal.

FIG. 8A illustrates a block diagram of a conventional non-CPM DSSS decoder using a correlator to decode an incoming oversampled DSSS signal. Because CPM encodes most of the data in a bit-shift of the PN code, such a circuit cannot be directly applied to a CPM encoded signal. The DSSS decoder of FIG. 8A includes a 64-chip PN code register, a 64-chip correlator, and a 256-chip shift register. DSSS decoder of FIG. 8A also includes sixty-four, 4 to 1 (4:1), multiplexers. The shift register receives an oversampled chip stream, such as 4 Mbps. The multiplexers receive input from the shift register and output to the correlator. The correlator compares the data received from the multiplexers with the PN code of PN code register and outputs the decoded DSSS data.

It should be noted that in order to extract the data encoded in the bit shift in the conventional solutions, it is necessary to test for a correlation of every possible bit shift of the incoming data in each chip period. In the 64-chip PN code example illustrated in FIG. 8A, correlation of every possible bit shift would require 64 tests. In the above example, this would mean rotating and correlating 64 times every 250 microseconds, requiring a 256 MHz clock into the shift register. Although this may result in a simple circuit, the power consumed in clocking a 256-chip shift register at 256 MHz would be unacceptably high.

In addition, conventional non-CPM DSSS systems require a large sacrifice of data rate to achieve the consequent gain in SNR, and conventional CPM decoders require the use of QPSK RF modulation.

Figure 8B:
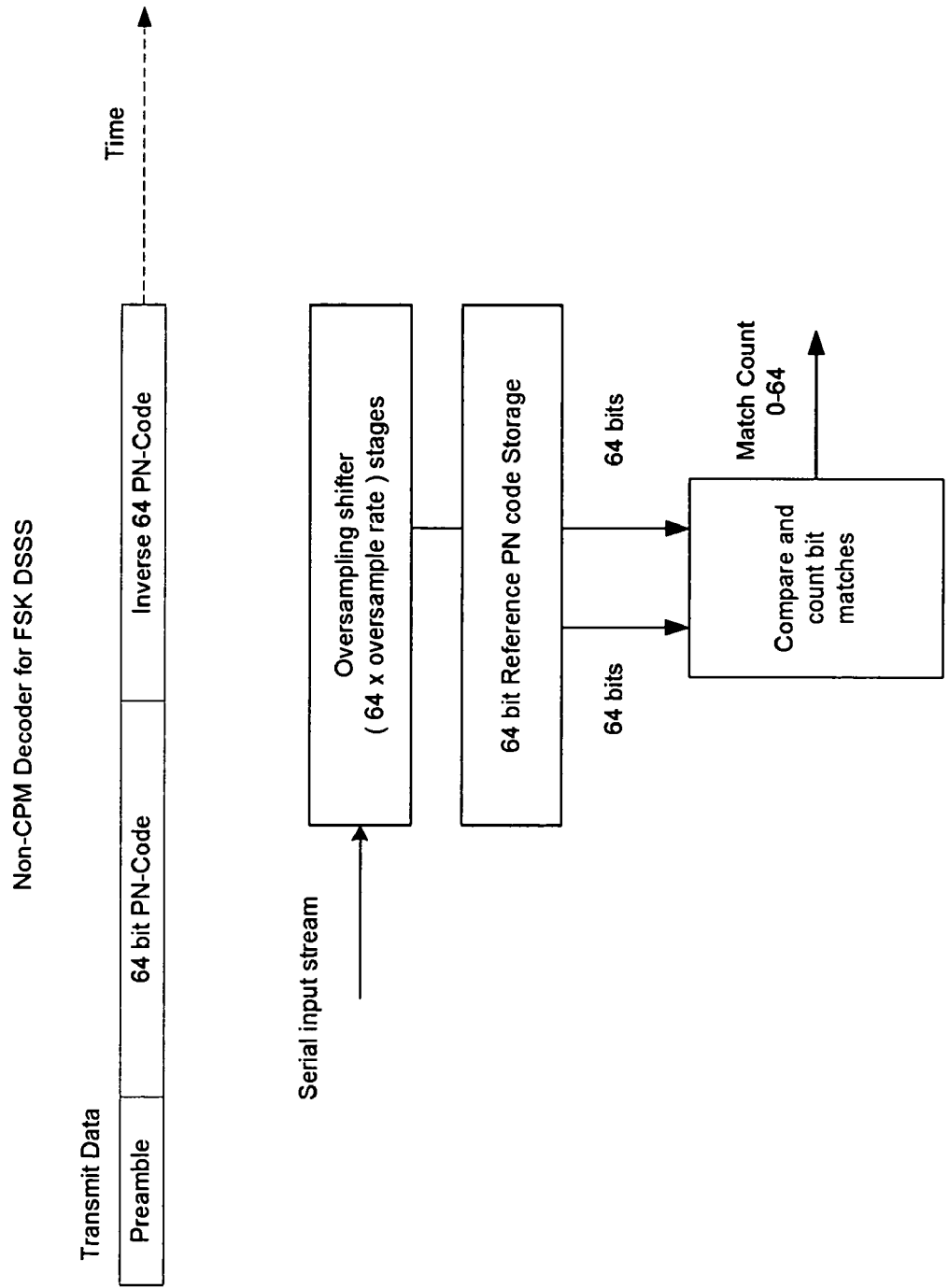
FIG. 8B illustrates a functional flow diagram of a conventional fixed oversampling rate system including a shift register.

FIG. 8B illustrates a functional flow diagram of a conventional fixed oversampling rate system including a shift register. Also shown in FIG. 8B is a transmit data sequence consisting of a preamble and two codes one based on the reference code and the other its bit-wise inverse. As illustrated in FIG. 8B, there are 64 oversampling shifter stages, in which the serial input stream is loaded into the shift registers at an oversampling rate (e.g., 64× oversampled rate). Next, the reference PN code storage outputs a 64-chip size PN code. Next, the loaded shift registers are compared with the PN code and the bit matches are counted, and provided as an output, match count 0-64.

Figure 8C:
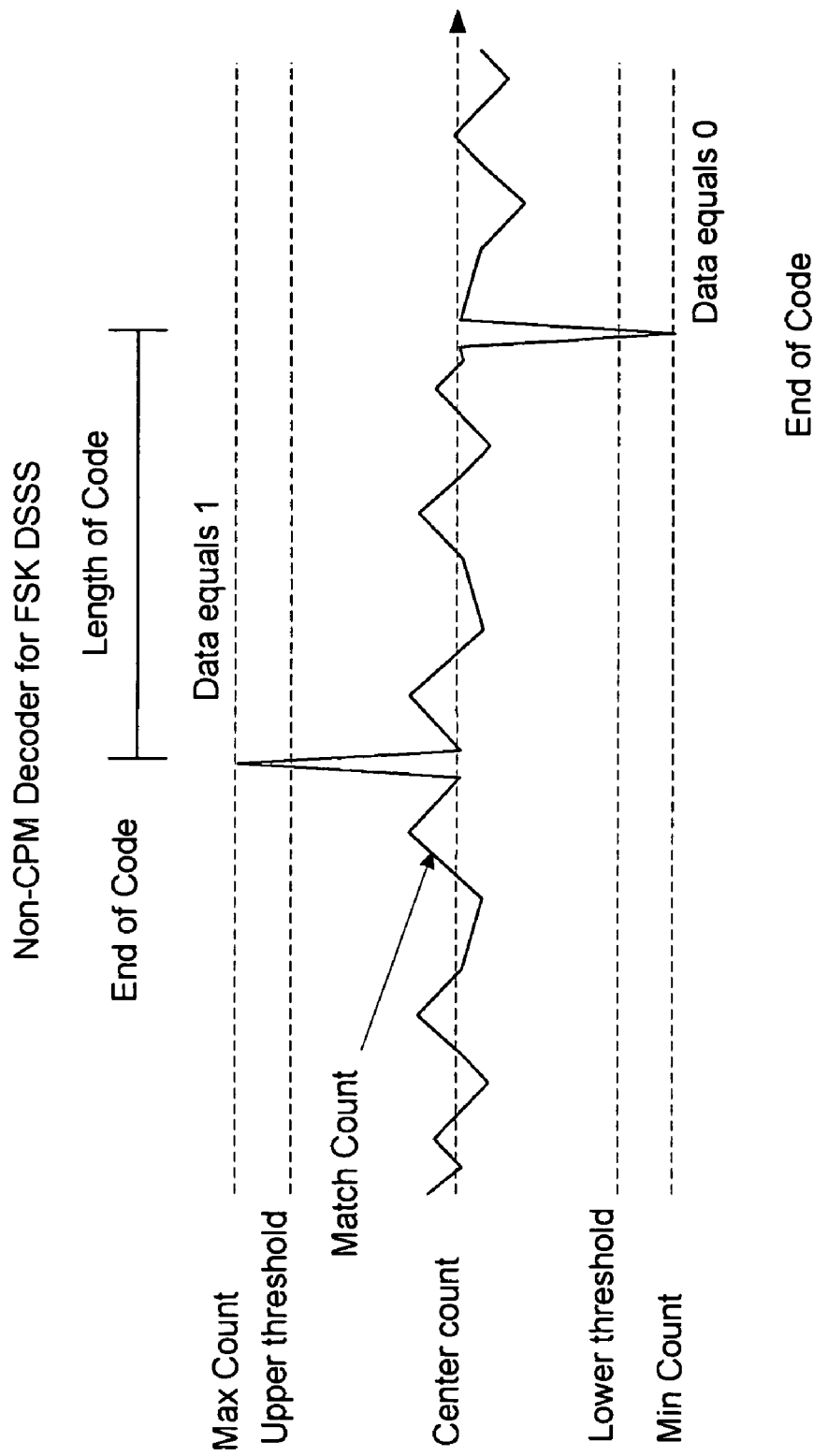
FIG. 8C illustrates a graph of a response of the correlator of FIG. 8A.

FIG. 8C illustrates a graph of a response of the correlator of FIG. 8A. As shifter data matches the reference PN code, or its inverse, sharp correlation peaks or match counts occur that are used to derive the data. A DSSS receiver in a spread spectrum system correlates a received spread spectrum RF data stream against known PN codes in order to extract data values. The receiver looks for PN-code matches and PN code mismatches. A match for a sample of PN code equals a data value of '1' and a match of an inverse sample of the PN code equals a data value of '0'. For example, a PN code having a specified length will have a match count at the end of the code. If the match count goes above an upper threshold to a max count, then the decoded data from that code is a '1.' If the match count goes below a lower threshold to a min count, then the decoded data from that code is a '0.' A counter in the receiver determines when there is a PN code match or mismatch. The counter maintains a match count for the number of chips in the reference PN code that match samples of the encoded data stream. When the chip match count reaches an upper threshold, the receiver generates a data value of '1'. When the chip match count reaches a lower threshold, the receiver generates a data value of '0'. The spread spectrum correlator has a high correlation characteristic, meaning that a large abrupt spike in the match count occurs when the receiver detects PN codes in the encoded data stream.

In order to successfully decode a received CPM encoded FSK signal, the incoming data is oversampled. For example, a 1 Mbps CPM encoded FSK RF signal may be received by the antenna 101, and input into a FSK receiver. The FSK receiver outputs the incoming data stream into a data slicer. The data slicer may be clocked at 4 MHz, resulting in oversampling the incoming data stream into 4 MHz bit stream to be received by the CPM decoder. In this example, the 1 Mbps chip stream is over-sampled four times (4×). This system may be similar to a conventional DSSS decoder used by conventional non-CPM FSK DSSS systems, except that the CPM decoder replaces the DSSS decoder. However, as previously explained, because CPM encodes most of the data in a bit-shift of the PN code, such a circuit of a conventional non-CPM FSK DSSS decoder cannot be directly applied to a CPM encoded signal.

FIG. 9A illustrates a block diagram of one embodiment of a CPM decoder including a CPM correlation block for decoding CPM signals. CPM decoder 904 includes code storage device 902, correlation block 901, and peak detector 903. Correlation block 901 receives the oversampled input chip stream 905 from the antenna 101, or alternatively from RF receiver 307. Correlation block 901 compares the oversampled input chip stream 905 with one or more reference codes 908, which are stored in code storage device 902. Peak detector 903 receives the output of correlation block 901. The peak detector 903 determines when a match count has been detected. In other words, when the oversampled input chip stream 905 matches the reference code 908 of code storage device 902, peak detector 903 outputs the corresponding data value (e.g., 0 or 1) as decoded CPM data 906.

FIG. 9B illustrates a block diagram of another embodiment of a CPM decoder including a CPM correlation block and a data alignment block for decoding CPM signals. CPM decoder 909 includes code storage device 902, correlation block 901, peak detector 903, and data alignment block 907. Data alignment block 907 receives the oversampled input chip stream 905 from the antenna 101, or alternatively from RF receiver 307. Data alignment block 907 is used to determine timing/alignment information regarding the chip stream using a first SOF symbol. As previously described, the SOF is used by the data alignment block 907 to synchronize the receiver with the incoming chip stream as described with respect to FIG. 14. In one embodiment, the SOF/SOP is a conventional non-CPM PN code or sequence, used to synchronize the receiver to the incoming chipstream. Alternatively, the SOF/SOP may be other codes or sequences known by those of ordinary skill in the art. The correlation of the first code or SOF symbol may be used in the decoding of subsequent symbols. The correlation of this first code is not used to extract phase data, but instead to extract timing/alignment information. This initial information derived from the first SOF symbol is used to establish the boundaries between the subsequent codes. Correlation block 901 receives the oversampled input chip stream 905 from data alignment block 907 and compares the oversampled input chip stream 905 with one or more reference codes 908, which are stored in code storage device 902. Peak detector 903 receives the output of correlation block 901. The peak detector 903 determines when a match count has been detected. In other words, when the oversampled input chip stream 905 matches the reference code 908 of code storage device 902, peak detector 903 outputs the corresponding data value (e.g., 0 or 1) as decoded CPM data 906.

Figure 10:
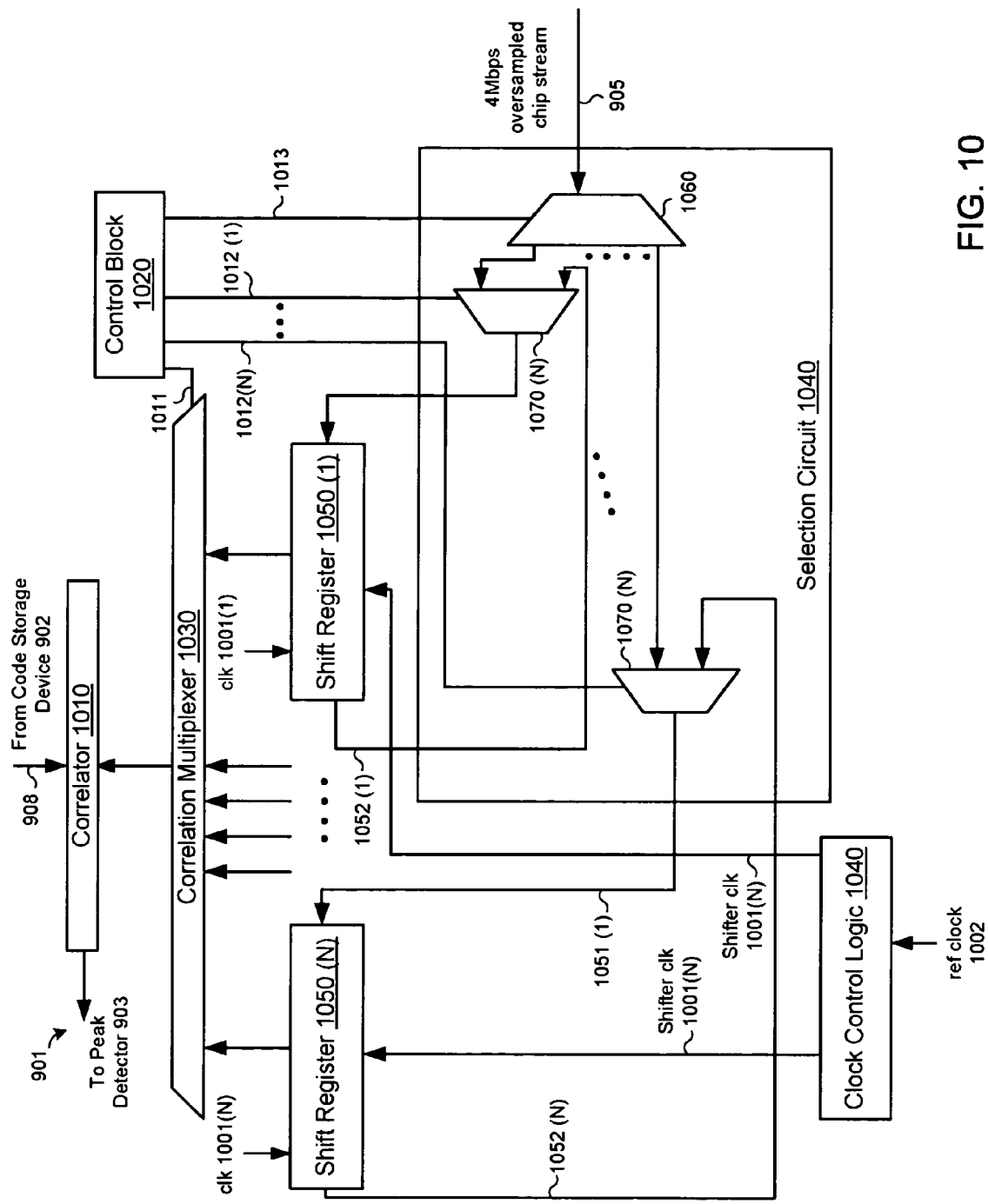
FIG. 10 illustrates a block diagram of one embodiment of a correlation block including a selection circuit and a plurality of shift registers for decoding CPM signals.

FIG. 10 illustrates a block diagram of one embodiment of a correlation block including a selection circuit and a plurality of shift registers for decoding CPM signals. Correlation block 901 includes a correlator 1010, a correlation multiplexer (MUX) 1030, control block 1020, selection circuit 1040, and a plurality of shift registers 1050(1)-1050(N), where N is a positive integer. The selection circuit 1040 receives the oversampled chip stream 905 from antenna 101 or RF receiver 307. The selection circuit 1040 provides the plurality of shift registers 1050(1)-(N) with the incoming oversampled chip stream 905 to be sampled into the shift registers 1050(1)-(N), using clock signals 1001(1)-1001(N). It should be noted that the clock signals may be generated by a high accuracy reference clock signal, for example, crystal 316. The selection circuit 1040 may also provide the plurality of shift registers 1050(1)-(N) with a feedback chip stream from the output of the corresponding shift register. In other words, the selection circuit 1040 is configured to select either a load operation or a correlation operation for each of the plurality of shift registers 1050(1)-(N).

In one embodiment, a first portion of the plurality of shift registers 1050(1)-(N) may be configured to perform a load operation, including loading in the incoming oversampled chip stream 905; and a second portion of the plurality of shift registers 1050(1)-(N) may be configured to perform a correlation operation, including rotating an output of the shift register to the input of the shift register. In another embodiment, the first and second portions of the plurality of shift register 1050(1)-(N) may be configured to perform only a loading operation.

The correlation operation may be used to decode the CPM encoded code of a shift register. More specifically, a method may include the correlation operation, which may include correlating a first PN code of a first shift register with a reference PN code. In order to correlate the first PN code, the first PN code in the first register may be compared with the reference PN code. Next, the operation includes rotating the first PN code within the first shift register. Then, the operation includes comparing the rotated first PN code in the first shift register with the reference code. Rotating the contents of the shift register may include looping or outputting the last digit of the shift register to become the first digit of the shift register and incrementing or shifting the other digits in the shift register upwards. Then as previously described, each time the first PN code is rotated within the shift register, the outputs of the shift register are compared with the reference code (e.g., reference PN code) of the code storage device. This process may be repeated for the entire length of the code to be decoded.

In one exemplary embodiment, a shift register 1050 may include a chain of K number of flip-flops, wherein K is a positive integer number that is equal to a PN code size. In this exemplary embodiment, the method including the correlation operation may include comparing outputs of the chain with the reference code. The outputs of the chain comprise the first PN code. The method also includes rotating chips of the first PN code within the chain. Rotating chips of the first PN code may include outputting a last chip of a last flip-flop to a first flip-flop of the chain. The method further includes comparing the rotated outputs of the chain with the reference code. These operations of rotating and comparing the rotated outputs may be performed K−1 times, allowing all rotated outputs to be compared against the reference code.

The load operation may include loading a first PN code of an input chip stream 905 into a shift register 1050. Loading the first PN code may include sampling a first chip of the first PN code of the input chip stream, shifting the first chip in the shift register 1050, sampling subsequent chips of the first PN code while shifting the chip in the shift register 1050, and shifting the subsequent chips in the shift register 1050. In one exemplary embodiment, a shift register 1050 may include a chain of K number of flip-flops, wherein K is a positive integer number that is equal to a PN code size. Loading the first PN code into the shift register 1050 may include sampling chips of the first PN code using a first flip-flop of the chain, and shifting chips into subsequent flip-flops of the chain. After K number of chips have been sampled and shifted by the chain the shift register 1050 includes the first PN code.

In one embodiment, the method may include loading a first PN code of an input chip stream into a first shift register, correlating the first PN code of the first shift register with a reference code, and loading a second PN code of the input chip stream into a second shift register while correlating the first PN code of the first shift register with the reference code. The method may further include comparing and rotating the second PN code with the reference code while loading a third PN code of the input chip stream into the first shift register. The method may also further include comparing and rotating the third PN code with the reference code while loading a fourth PN code of the input chip stream into the second shift register.

It should be noted that in the embodiments described herein the plurality of shift registers 1050(1)-(N) may be controlled using the control block 1020 and/or the selection block 1040 to perform either a load operation or a correlation operation, as described above. Alternatively, the plurality of shift registers 1050(1)-(N) may be controlled using the control block 1020 and/or the selection block 1040 to perform a load operation, as described above. When the plurality of shift registers 1050(1)-(N) are operating in a load operation, the outputs of the plurality of shift registers 1050(1)-(N) may be correlated by the correlator 1010, as done in conventional correlator architectures. In one embodiment, when all of the plurality of shift registers 1050(1)-(N) are operating in a load operation, the correlation block 901 may be operating at a oversampling rate, and when a portion of the plurality of shift registers 1050(1)-(N) are operating in a load operation and the other portion in a correlation operation, the correlation block 901 may be operating at half the oversampling rate.

In one embodiment, selection circuit 1040 includes a plurality of multiplexers 1070(1)-1070(N), where N is a positive integer. The plurality of multiplexers 1070(1)-(N) are coupled to each of the plurality of shift registers 1050(1)-(N). The plurality of multiplexers 1070(1)-(N) are configured to select at least one of an input chip stream or an output of corresponding shift registers to be received by the corresponding shift register. In other words, the selection circuit, including the plurality of multiplexers 1070(1)-(N), are used to control whether a shift register 1050 operates in a load operation or correlation operation. The load operation includes selecting the input chip stream to be input into shift register 1050, and the correlation operation includes selecting the output of the shift register 1050 to be looped or feedback into the input of the shift register 1050. In one embodiment, all of the plurality of shift registers 1050(1)-(N) operate in a load operation. In another embodiment, half of the plurality of shift registers 1050(1)-(N) operate in a load operation, and half in a correlation operation. Alternatively, other fractions of shift registers may be configured to operate in a load and correlation operations.

In another embodiment, selection circuit 1040 may further include a multiplexer 1060 coupled to the plurality of multiplexers 1070(1)-(N). Multiplexer 1060 may be configured to select one or more multiplexers of the plurality of multiplexers 1070(1)-(N) to receive the input chip stream (e.g., oversampled chip stream 905).

In one embodiment, correlation block 901 may further include a control block 1020. Control block 1020 is coupled to the selection circuit 1040, including the plurality of multiplexers 1070(1)-(N). Control block 1020 may also be coupled to the correlation multiplexer 1030 to determine which output of the plurality of shift registers 1050(1)-(N) is to be compared with the one or more reference codes 908 in correlator 1010. Control block 1020 may provide select or address lines 1012(1)-(N) to the plurality of multiplexers 1070(1)-(N) to select a load or correlation operation for the plurality of shift registers 1050(1)-(N). In other words, the select or address lines 1012(1)-(N) may be used to select whether each of the plurality of shift registers 1050(1)-(N) receives the incoming oversampled chip stream 905 or a feedback chip stream from the output of the corresponding shift register. Control block 1020 may also provide a select or address line(s) 1013 to multiplexer 1060 to select which of the plurality of multiplexers 1070(1)-(N) is to receive the incoming oversampled chip stream 905. In one embodiment, the control block 1020 may be a hardware state machine. The hardware state machine may generate the shift and rotate controls to the selection circuit 1040, such as select or address lines 1012(1)-(N). The control block 1020 may be programmable and may vary the number of shift registers that are shifting in the incoming chip stream and the number of shift registers that are looping or rotating the data of the shift registers. For example, in the exemplary embodiment of FIG. 11, all four shift registers may be active all of the time or alternatively, two shift registers may be active, resulting in a power reduction. It should be noted that reducing power may be a trade off against some increased sensitivity to frequency mismatch. In one embodiment, the control block 1020 and the selection circuit 1040 may be used to control the length of the codes, for example, 32-chip length codes or 64-chip length codes. Alternatively, other components known by those of ordinary skill in the art may provide control signals to selection circuit 1040.

Figure 11:
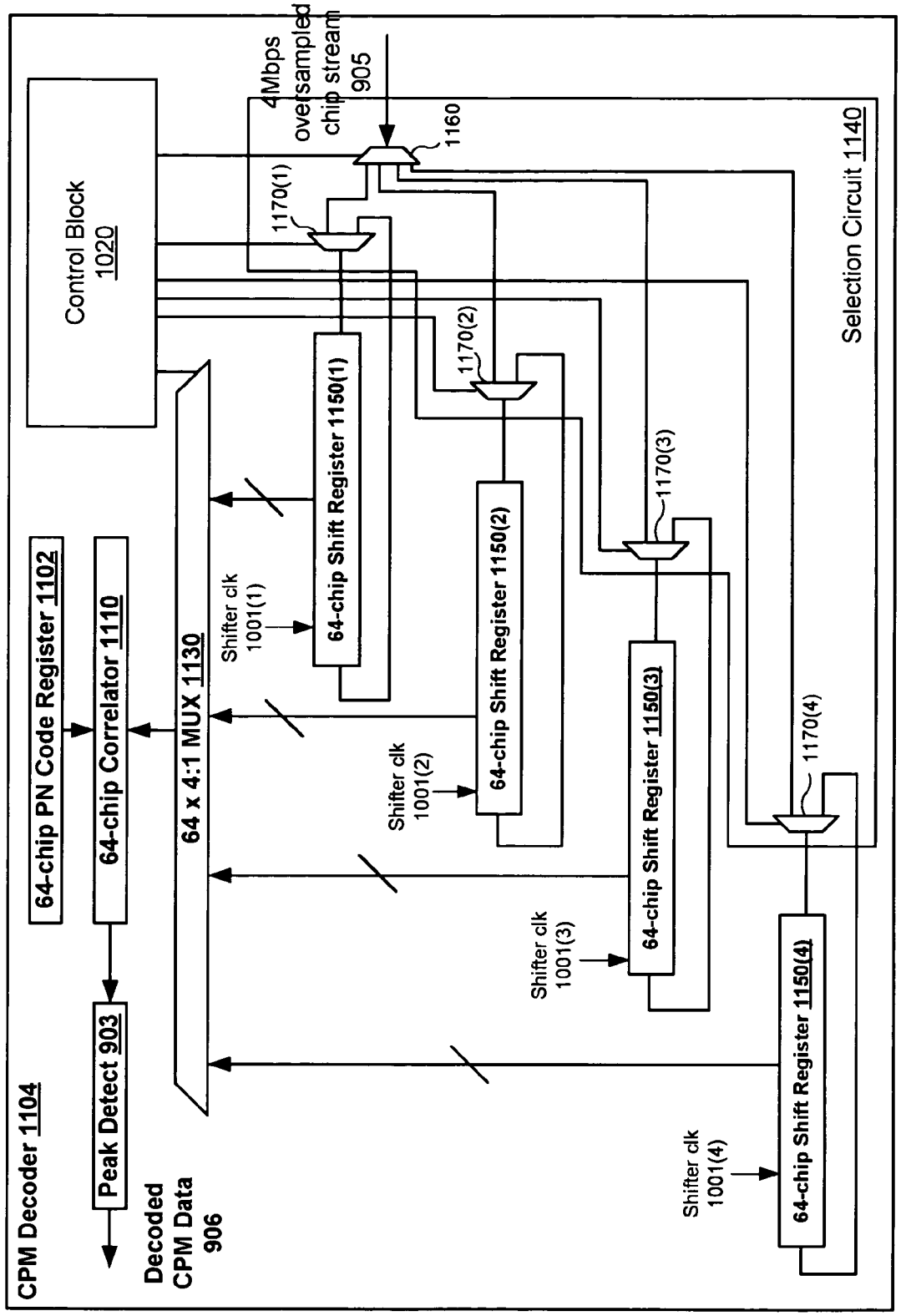
FIG. 11 illustrates a block diagram of an exemplary embodiment of a CPM decoder including a selection circuit and four shift registers for decoding CPM signals.

FIG. 11 illustrates a block diagram of an exemplary embodiment of a CPM decoder including a selection circuit and four shift registers for decoding CPM signals. CPM decoder 1104 includes a 64-chip PN code register 1102, a 64-chip correlator 1010, a peak detector 903, correlation MUX 1130 (e.g., sixty-four 4 to 1), control block 1020, selection circuit 1140, and four 64-chip shift registers 1150(1)-1050(4). The selection circuit 1040 receives oversampled chip stream 905, at 4 Mbps, from antenna 101 or RF receiver 307. The selection circuit 1140 provides the four shift registers 1150(1)-(4) with the incoming oversampled chip stream 905 to be sampled into the four shift registers 1150(1)-(4). The selection circuit 1140 may also provide the four shift registers 1150(1)-(4) with a feedback chip stream from the output of the corresponding shift register. In other words, the selection circuit 1140 is configured to select either a load operation or a correlation operation for each of the four shift registers 1150(1)-(4). The selection circuit 1140 includes four multiplexers 1170(1)-(4), coupled to the input and output of the four shift registers 1150(1)-(4). The four multiplexers 1170(1)-(4) may be used to select either the oversampled chip stream 905 or the feedback chip stream from the output of the corresponding shift registers. The selection circuit 1140 also includes multiplexer 1160, which is coupled to the four multiplexers 1170(1)-(4). The multiplexer 1160 receives the incoming oversampled chip stream 905 and selects, which of the four multiplexers 1170(1)-(4) to receive the oversampled chip stream 905. As previously described, control block 1020 may be configured to control the select and/or address lines of multiplexer 1160, and the four multiplexers 1170(1)-(4).

In one embodiment, the four separate shift registers 1150(1)-(4) are each clocked separately by shifter clocks 1001(1)-1001(4) with control to allow looping or shifting of data. The shifting of data is used in the loading operation, and the looping of data is used in the correlation operation. In this embodiment, the 64-chip PN code register 1102 is coupled to a 64-chip correlator 1110. The correlator 1110 compares the data output from the multiplexer 1130 with the PN code stored in the PN code register 1102. The correlator 1110 is coupled to a peak detector 903. The peak detector 903 is configured to operate to detect match counts, to provide the decoded CPM data 906, as previously described. This embodiment further includes sixty-four, 4 to 1 multiplexers (e.g., correlation MUX 1130), having outputs coupled to the 64-bit correlator 1110. The inputs to the sixty-four multiplexers receive a 4 Mbps oversampled chip stream, which passes through the four 64-chip shift registers 1150(1)-(4), each having a plurality of outputs coupled to inputs of the four multiplexer 1170(1)-(4) for the looping operation, and a plurality of outputs coupled to the inputs of the correlation MUX 1130 for the correlation operation An embodiment of a method, using the exemplary embodiment described above, may include decoding a first symbol.

Decoding the first symbol may be done as previously described with respect to the non-CPM decoder for FSK DSSS of FIG. 8A. The initial correlation may use all the shift registers to load the incoming chip stream. Each of the shifters may be clocked sequentially so evenly spaced samples are taken, and then compared in sequence. It should be noted that shifting and comparing the chips in sequence may result in the same net effect as described with reference to FIG. 8A using one 246-chip shift register. Because the transmitting device is asynchronous to the receiver, the boundaries of the chips may have to be deduced by this initial correlation. The correlation peak may be established by correlating against each shifter contents, so long as the correlation peak width is wider than the sample spacing. This mode of operation is illustrated and described with reference to FIG. 12A.

After the first symbol is decoded, the incoming 4 mbps over-sampled data may be clocked (e.g., loaded) into two of the four shift registers, 1150(3) and 1150(4), using shifter clocks 1001(3) and 1001(4), which are clocked out of phase of the other. The first 64 even position chips are shifted into the first shift register 1150(1), using shifter clock 1001(1), the 64 odd position chips into the second shift register 1150(2), using shifter clock 1001(2). In other words, half of the shift registers may be used to shift while the other half rotate. After a code period, they may trade roles in a ping-pong fashion. In order to clock out of phase with each other, N clocks are phase aligned at increments of 360/N degrees, such that no two are aligned, and an effective sample rate of N can still be achieved. For example, in a microsecond N samples may be taken, each shift register sees a 1 MHz clock, but the sample rate is the equivalent of an N MHz shift register.

In this embodiment, during the time that these two shift registers 1150(1) and 1150(2) are being loaded with the incoming chips stream 905, the other two shift registers 1150(3) and 1150(4) are being rotated using shifter clocks 1001(3) and 1001(4). A rotation of the shift register includes looping back or providing a feedback chip stream from the same shift register (e.g., outputting the last digit of the shift register to be the first digit of the shift register, and shifting the other digits in the shift register). On each rotation of the shift registers 1150(3) and 1150(4), the output of the corresponding shift registers are compared with the PN code of the PN code register 1102 by the correlator 1110.

In order to decode the data encoded in the position shift, a peak detector is employed. Peak detector 903 detects the timing of the correlation peak, which will occur at the time that the rotation of the incoming chip stream matches the position shift encoded by the transmitter. In the exemplary embodiment described above, the chipping rate may be 1 MHz, so the data encoded in the position shift can be inferred from the number of microseconds of the correlation peak after the start of rotation. For example, if 0x00101 (i.e., 13) were encoded in the position shift, the correlation peak would occur 13 microseconds after the beginning of rotation, which is equal to fifty-two 4 MHz clock cycles. Chips are the RF frequency variations that become the 1's and 0's of the transmission data received. It should be noted that the oversampling rate must be higher than the chipping rate.

In another exemplary embodiment, the improved solution comprises a 64 bit-chip length correlator operating at 1 MHz chipping rate, with an oversampling rate of 3 and 6 MHz. The improved solution comprises 6 separate shifter chains of 64 flops each, where each chain of 64 flops is clocked individually at 1 MHz, and each of the 6 separate 1 MHz clocks is phase aligned such that in a one microsecond period 6 samples may be taken (i.e., Chain 0 is clocked on the 0th period, chain 1 on the 1st, etc). In addition, the improved solution comprises multiplexing and control logic for ensuring the values in the shifters can be compared with a reference code. The improved solution further comprises controls to enable the input to each 64-flop shifter to be multiplexed such that the data may either be sampled and loaded into the shifter (e.g., loading operation), or rotated within the same shifter (e.g., correlation operation). Further individual controls allow all the shifters collectively to operate in two modes, a first operating mode as a correlator, and a second operating mode as a CPM decoder.

A first operating mode is where all six shifters are sampling, and the output is MUXED such that the code comparison logic is presented with 64-chip sample at 6 MHz. This mode is used to extract timing and/or alignment information from the first SOF symbol.

A second operating mode is where 3 of the shifters are sampling while the other 3 are rotating previously sampled data. The rotated values are presented to the code comparison logic at a rate of 3 MHz. Using this method, during the arrival time of a code from the air, the previously received code can be fully rotated though all possible rotations and the peak correlation phase extracted. An over-sampling rate of 3 MHz is applied to the correlation of both codes.

In the exemplary embodiment of FIG. 11, including four shift registers, a single structure may be built to give 4× oversampling of the first SOF symbol, and 2× oversampling of the later symbols. The correlation of the first code helps in the decoding of subsequent symbols. The correlation of this first code is not used to extract phase data, but instead to extract timing and/or alignment information. This timing and/or alignment information may be used to establish the boundaries between the subsequent codes. This structure's inherent 2N (e.g., 4) over-sampling rate during the correlation of this first code may give better sampling accuracy of this first correlation value. In other words, all the all the phase detection logic may be efficiently and fully re-directed to timing extraction when phase information is not being extracted. Because only 1/(2N)th (e.g., ¼) of the structure is being clocked at a given time, a significant noise and power reduction may be achieved without lowering the maximum effective oversampling rate. In this embodiment, the effective rate is 4. The effective oversampling rate may be used to describe the performance of a full shifter correlator as described in FIG. 8A in comparison to the embodiments of the improved circuit described herein. For example, in this embodiment, the improved circuit may still capture a correlation peak that would require full correlation at 4 MHz despite only taking 2M samples per second. The full shifter correlator of FIG. 8A may not match a correlation peak at 2 MHz; however, the improved circuit may match a correlation peak at 2 MHz, after the initial SOF alignment at 4 MHz.

The improved circuit architecture described in the present embodiments may allow for use of clock control logic to affect dynamic reduction of the oversampling rate. For example, in the architecture of FIG. 11, four shifter registers may be used to affect an oversampling rate of 4 samples per chip against a single code in a first operating mode, and then 2 samples per shift against the subsequent codes in a second operating mode. The conventional implementation must be clocked at a single oversampling rate. This improved circuit architecture may allow for potentially reducing the clocking to a single shifter or single array element after the initial symbol correlation. This may decrease the power consumed to facilitate the circuit in a very low power mode when conditions allow. In one embodiment, the improved circuit may include an array of 6 shifters, and after the initial symbol correlation, the clock may be reduced to a single shifter or single array element per clock cycle.

In an alternate embodiment, this array approach may also be extended to allow for some of these structures correlating against different codes, while still allowing all resources to be applied to affect a 2N oversampling when needed.

Figure 12A:
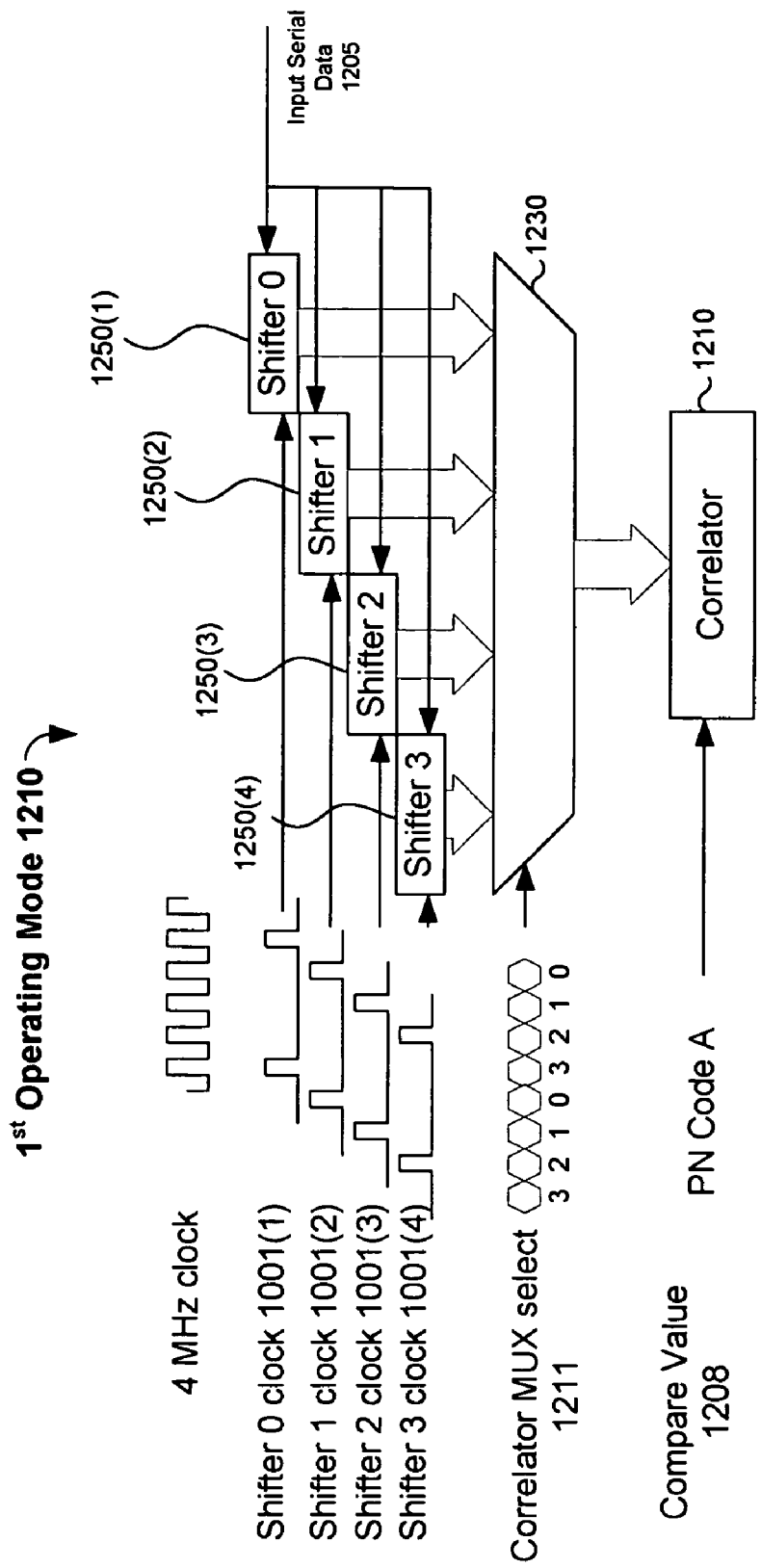
FIG. 12A illustrates one embodiment of four shift registers operating in a first operating mode as a shift correlator.

FIG. 12A illustrates one embodiment of four shift registers operating in a first operating mode as a correlator. First operating mode 1210 includes four shifters 1250(1)-(4) that operate as a single code correlator. In this embodiment, all four shifters 1250(1)-(4) may be used to affect an oversampling rate of 4 samples per chip against a single code. 'Shifters 0-3' receive 'shifter 0-3 clocks' 1001(1)-(4). 'Shifters 0-3' also receive the input serial data 1205. Input serial data 1205 includes one or more PN codes in an encoded CPM chip stream or sequences. A first chip of a first PN code may be loaded into 'Shifter 3' 1250(4) by clocking 'Shifter 3' 1250(4) by 'shifter 3 clock' 1001(4) during a first clock period of the reference clock 1002. Next, a second chip of the first PN code may be loaded into 'Shifter 2' 1250(3) by clocking 'Shifter 2' 1250(3) by 'shifter 2 clock' 1001(3) during a second clock period of the reference clock 1002. Next, a third chip of the first PN code may be loaded into 'Shifter 1' 1250(2) by clocking 'Shifter 1' 1250(2) by 'shifter 1 clock' 1001(2) during a third clock period of the reference clock 1002. Next, a fourth chip of the first PN code may be loaded into 'Shifter 0' 1250(1) by clocking 'Shifter 0' 1250(1) by 'shifter 0 clock' 1001(1) during a fourth clock period of the reference clock 1002. This process may continue until the four shifters 1250(1)-(4) have been completely loaded. Correlation MUX 1230 receives the output of the four shifters 1250(1)-(4). The correlation MUX 1230 receives on its select or address lines 1211, the following address combinations: 3, 2, 1, 0, 3, 2, 1, 0 . . . etc. This combination represents that, first, the correlation mux 1230 receives the output of 'Shifter 3' 1250(4), then the output of 'Shifter 2' 1250(3), then the output of 'Shifter 1' 1250(2), and then the output of 'Shifter 0' 1250(1), and so on. The outputs of the 'Shifters 0-3' are multiplexed by correlation multiplexer 1230 to allow 4× comparisons against a single compare value 1208, PN Code A, by correlator 1210. This architecture and method may operate as a conventional oversampling correlator.

Figure 12B:
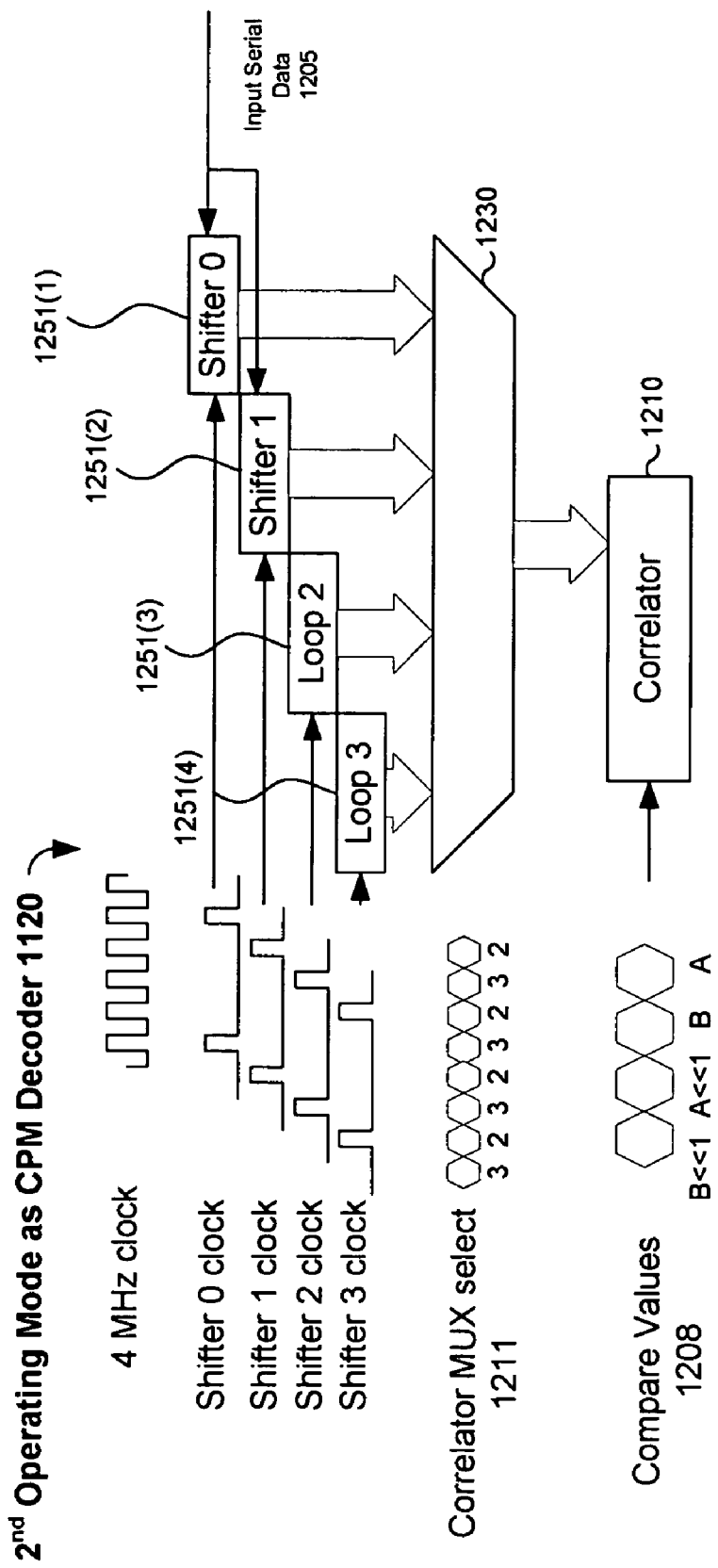
FIG. 12B illustrates one embodiment of four shift registers operating in a second operating mode as a CPM decoder.

FIG. 12B illustrates one embodiment of four shift registers operating in a second operating mode as a CPM decoder. Second operating mode 1220 includes four shifters 1250(1)-(4) that operate in either a load operation or a correlation operation. In this embodiment, all four shifters 1250(1)-(4) may be used to affect an oversampling rate of 2 samples per chip multiple phase aligned codes.

Assuming that all four shifters, 'shifters 0-3' 1250(1)-(4), have been previously loaded, in the second operating mode, 2 shifter registers, 'Shifter 3 and 2' 1250(4) and 1250(3), become 'Loop 3' 1251(4) and 'Loop 2' 1251(3), looping or rotating previously loaded data. The other two shift registers, 'Shifter 1 and 0' 1250(2) and 1250(1), continue to sample and shift data from the input serial data 1205. Correlation MUX 1230 receives the output of two of the four shift registers, 'Loop 2 and 3' 1251(3) and 1251(4). The correlation MUX 1230 receives on its select or address lines 1211, the following address combinations: 3, 2, 3, 2, 3, 2, 3, 2 . . . etc. This combination represents that, first, the correlation mux 1230 receives the output of 'Loop 3' 1251(4), then the output of 'Shifter 2' 1251(3), then the output of 'Loop 3' 1251(4), and then the output of 'Shifter 2' 1251(3), and so on. The output of 'Loop 2 and 3' 1251(3) and 1251(4) are multiplexed by multiplexer 1230 to allow 2× comparison against 2 compare values 1208, two different PN codes, PN Codes A and B. In other words, while a code of length N is loaded into 'Shifter 0' and 'Shifter 1', N possible alignments are compared against codes A and B in shifter registers, 'Loops 2 and 3.'

In the second operating mode, 2 of the shifters are sampling while the other 2 are rotating the previously sampled data. The rotated values are presented to the code comparison logic at a rate of 2 MHz. Using this method, during the arrival time of a code from the air, the previously received code can be fully rotated though all possible rotations and the peak correlation phase extracted. An over-sampling rate of 2 is applied to the correlation of both codes.

It should be noted that the embodiments of FIGS. 12A and 12B include 4 shift registers, an oversampling rate of 4 MHZ, and has used a clocking scheme to load and loop the input serial data in Shifter 3 to Shifter 0 sequentially. Alternatively, other numbers of shift registers, other oversampling rates, and other clocking schemes for loading and looping the input serial data may be used as known by those of ordinary skill in the art.

The improved circuit architecture and method as described is part of an FSK radio system. They are equally applicable to other RF modulation methods. It should be noted that the QPSK modulation adopted by 802.15.4 uses half of the available bandwidth to allow the use of a self-clocking CPM decoder. If using the invention with QPSK modulation, it would be possible to double the available throughput compared with the 802.15.4 implementation.

The invention as described uses 1-chip resolution to the position shifting of the data. The invention is equally applicable to 2 or more chip position shifting resolution (for example encoding 4 bits of data in 4-chip shifts of a 64-chip PN code). Although reducing the available data throughput, use of lower resolution position shifting may improve the robustness of the link, by increasing coding gain. All references to specific bits rates, frequencies, oversampling rates, etc. are purely exemplary. The invention is applicable to any bit rate, frequency and oversampling rate.

As previously described, data alignment block is used to determine timing/alignment information regarding the chip stream using a first SOF symbol. The correlation of the first code or SOF symbol may be used in the decoding of subsequent symbols. The correlation of this first code is not used to extract phase data, but instead to extract timing/alignment information. This initial information derived from the first SOF symbol may be used to establish the boundaries between the subsequent codes.

In one embodiment, the receive bit alignment may be based on initial correlation. However, changing the bit sample rate after the initial correlation may not be a trivial matter. Simply running at a lower clock frequency may result in known errors being sampled at chip boundaries. The data alignment block may be used to realign the incoming chip stream and may ensure that these known errors at the chip boundaries are not used to decode the code.

Figure 13:
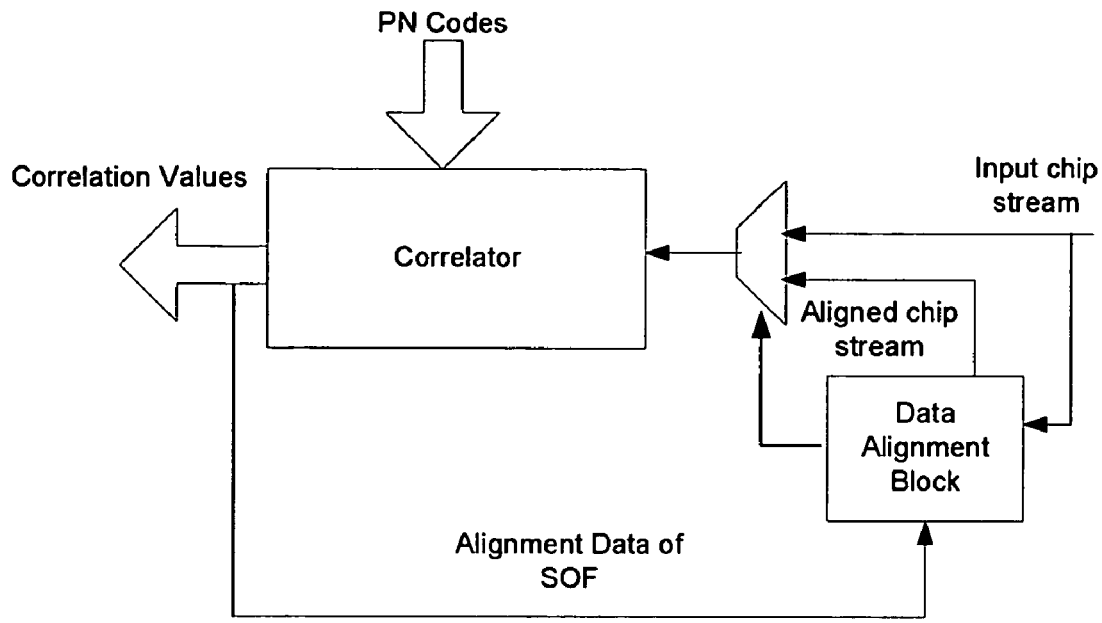
FIG. 13 illustrates a block diagram of one embodiment of a CPM decoder including a correlator and a data alignment block.

FIG. 13 illustrates a block diagram of one embodiment of a CPM decoder including a correlator 1320 and a data alignment block 1310. The CPM decoder includes correlator 1320, data alignment block 1310, and multiplexer 1330. The multiplexer 1330 receives the input chip stream 1311, and aligned chip stream 1312. The multiplexer 1330 is coupled to the data alignment block 1310. Data alignment block 1310 receives the input chip stream 1311, feedback from the correlation values 1314 on line 1315, which includes the alignment data of the SOF symbol. Data alignment block 1310 determines the center of the SOF and centers the subsequent symbols as the aligned chip stream 1312 to be provided to multiplexer 1330. Data alignment block provides, as output, a select line 1316 to select the input chip stream 1311 or the aligned chip stream 1312 in multiplexer 1330. Correlator 1320 is coupled to the output of the multiplexer 1330, and receives either the input chip stream 1311 or the aligned chip stream 1312. Correlator 1320 also receives the reference PN code or codes 1313 from the code storage device. Correlator 1320 compares the incoming chip stream against the reference PN codes 1313 and produces, as output, the correlation values 1314.

During simple correlation data alignment block 1310 presents the data on line 1317 to the shifters of the correlator unmodified (e.g., input chip stream 1311), but once the code alignment is deduced, it switches the data on line 1317 to be received by the shifters of the correlators to the aligned data on line 1312. This data alignment block 1310 oversamples at a higher rate than the chip stream 1311 and takes the sequence of correlation values 1314 during the first successful correlation to locate the chip center and adjust the sampling rate for subsequent symbols. By adjusting the sampling rate for the subsequent symbols, the samples near the chip boundaries may be excluded.

In one exemplary embodiment, the data alignment block operates in the following manner. In a first operation, once the correlation reaches a pre-set threshold, the number of samples above that threshold is counted. In a second operation, the chip center is extracted. In a third operation, only samples centered on or around that center sample are then applied to correlators for decoding. In particular, samples that are near the edge of the correlation peak may be dropped and not applied to the correlators. In an alternate embodiment, any other centering algorithm may be implemented to achieve realignment of the incoming chip stream, using the samples that are near the center of the correlation peak.

Figure 14:
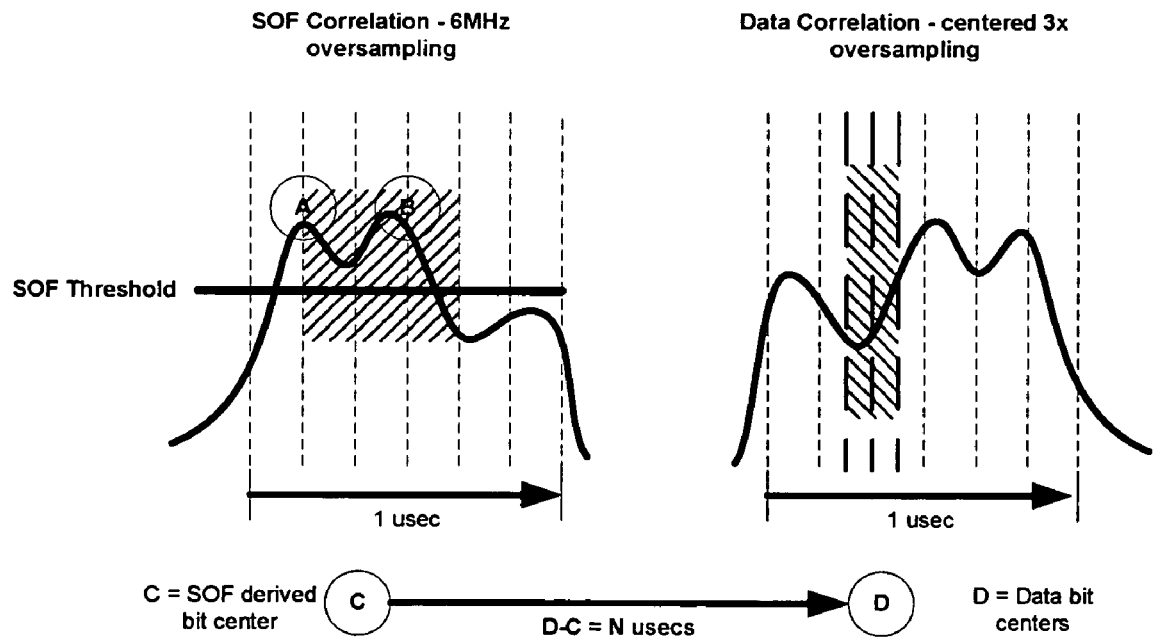
FIG. 14 illustrates a timing diagram of one embodiment of a response of the data alignment block of FIG. 13.

FIG. 14 illustrates a timing diagram of one embodiment of a response of the data alignment block 1310 of FIG. 13. The left timing diagram illustrates the SOF correlation at 6 MHz and the correlator output 1401 for evenly spaced 6 MHz samples. The correlation peak center is derived at position C 1402. Position C 1402 represents the SOF derived bit center. The right timing diagram illustrates the data correlation output with a center 3× oversampling. In the right timing diagram the data alignment block 1310 presents samples on and adjacent to position C 1402 (e.g., 1403-1405) to the correlator 1320. In the subsequent symbols, the data bit center is represented as position D 1406. Though fewer samples are presented in the right diagram of the subsequent symbols, the samples are centered and avoid transitional samples at chip boundaries. In FIG. 14, only the samples that center on and adjacent to position C in the original correlation may be applied to the shifters after this initial correlation (e.g., samples on and/or adjacent to position D). In this embodiment, there are three samples (e.g., 1403-1405) that are applied to correlator 1320. In one embodiment, the three samples may be combined in a majority vote fashion. Alternatively, a single sample might be used to further reduce the power consumption of the data decoding logic. This realigning of samples may be important when used with code phase modulation, since a correlation peak may shift from one phase to another. As illustrated and described with reference to FIG. 14, by simply reducing the sample rate by half without any data alignment, the possibility of errors would increase because the chip stream would include samples at the chip boundaries.

In one exemplary embodiment, a simple shifter and state machine may be implemented at 12 MHz clock rate. This allows the correlators to effectively sample in a narrow window while still being run at their relatively slow clock rate of 6 MHz. Alternatively, other circuits known by those of ordinary skill in the art may be used to control and determine a sampling window to effectively sample the incoming codes.

Figure 15:
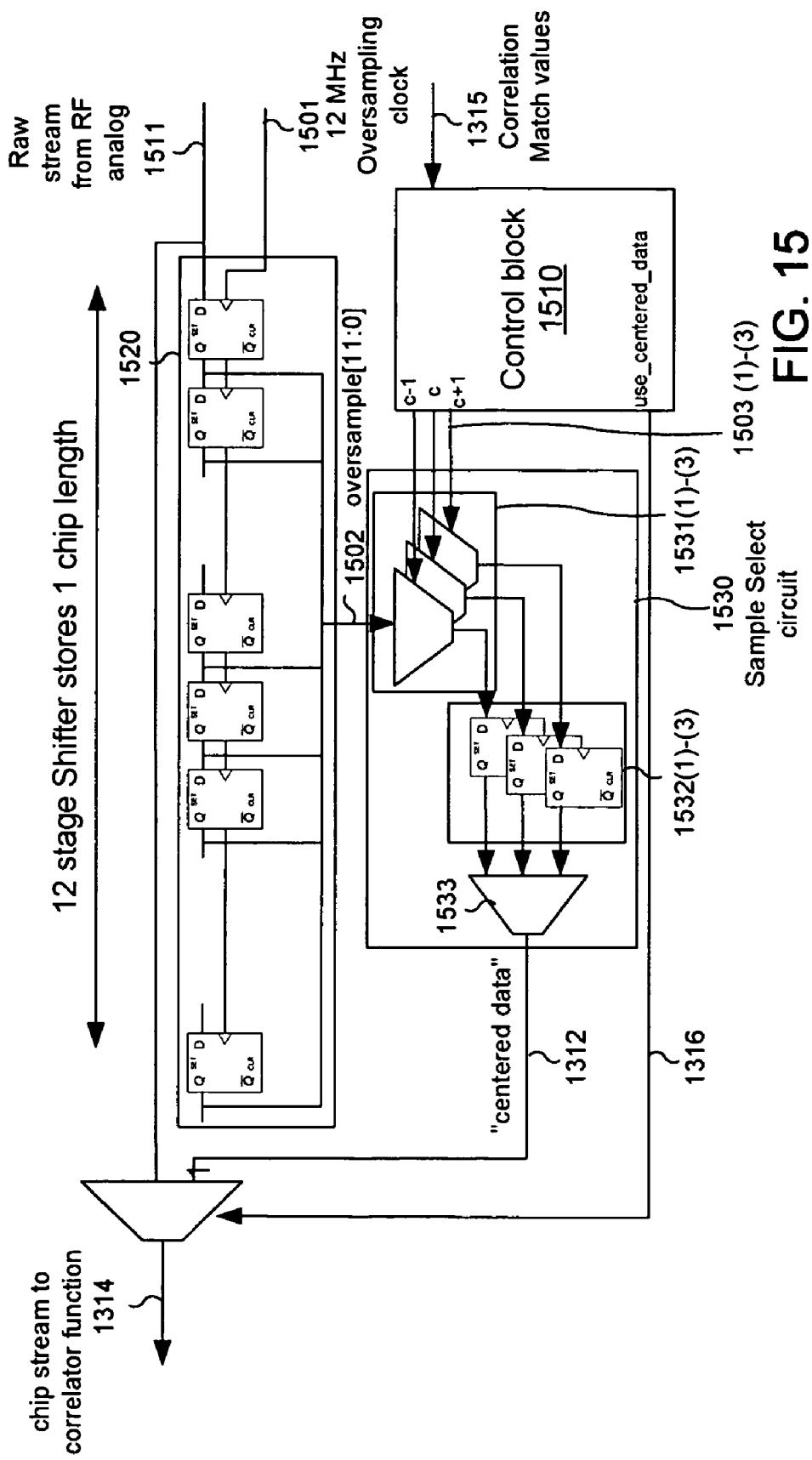
FIG. 15 illustrates a block diagram of one exemplary embodiment of a data alignment block.

FIG. 15 illustrates a block diagram of one exemplary embodiment of a data alignment block 1500. Data alignment block 1500 includes a shifter 1520, which includes 12-bit flip-flops, a control block 1410, sample select circuit 1530, and multiplexer 1330. The shifter 1520 receives the raw stream 1411 from the RF analog circuitry, and an oversampling clock of (e.g., 12 MHZ) 1501. The oversampling clock 1501 samples the input stream into the 12 flip-flops. The 12 flip-flops represent a 12 stage shifter, which stores 1 chip length. The shifter 1520 provides oversampled data 1502 to the sample select circuit 1530. Sample select circuit 1530 also receives control signals from control block 1510 to present three samples (e.g., 1403, 1404, and 1405) to the correlators 1320. Sample select circuit 1530 may include one or more multiplexers (e.g., 1531(1)-(3)) to select one or more samples from the oversampled data 1502. The one or more multiplexers 1531 may receive control or select lines from control block 1510 (e.g., select lines 1503(1)-(3)). The sample select circuit 1530 may also include one or more holding flip flops (e.g., holding flip-flops 1532(1)-(3)) to hold the values of the sample selected by the one or more multiplexers 1531. Sample select circuit 1530 may also include a multiplexer or other logic to select the one or more samples of the one or more holding flip-flops 1532. The multiplexer may provide as output the centered data 1312 to the multiplexer 1330. Control block 1510 receives information from the SOF symbol, which includes the correlation match values 1314 on line 1315. The correlation match values 1314 are used to determine the center position to control the sample select circuit 1530 via select lines 1503. The control block 1510 also provides as output the select line 1316 to multiplexer 1330. The select line 1316 is used to determine whether to present the raw stream 1511 or the aligned chip stream 1312 (e.g., centered data) to the correlator 1320 on line 1317.

In this embodiment, although not illustrated, there is a downstream 6 MHz correlator coupled to the output of the data alignment block 1500 on line 1317, to receive the chip stream for correlating. The chipping rate is 1 MHz, resulting in 1 microsecond per chip period, and 1 microsecond correlation peak widths. It should be noted that other values may be used for the chipping rate, the operating frequency of the correlator, and the correlation peak widths. The centering block or data alignment block 1500 runs synchronously with the correlator clocks. A 12 MHz clock is applied to a 12-bit flip-flop based shifter 1520. The 12-bit flip-flop based shifter is a 12 state shifter, which stores one chip length due to the oversampling of 12 MHz. Control block 1510 initially sets the select line 1316 to be equal to zero (e.g., use_centered_data=0), which selects the raw stream 1511 received from the RF analog circuit to be presented to the downstream correlator on line 1317 as the input chip stream. The downstream correlator match values 1314 are monitored by the logic of the control block 1510 on feedback line 1315. The correlation match values 1314 may be used to determine timing/alignment information regarding the subsequent codes of the chip stream using a SOF symbol. The chip center of the SOF at position C 1402 is derived from the correlation match values 1314. When the chip center is known, the logic of control block 1510 switches the output on the select line 1316 (e.g., use_centered_data=1) to pass the centered data on line 1312 to the downstream correlators 1320 as the chip stream on line 1317. In this exemplary embodiment, when the select line 1316 is switched, three samples are presented to the correlators 1320. In place of the raw stream 1511, a sequence of the positions C−1, C, C+1 values (e.g., 1403, 1404, and 1405) of the chip are presented sequentially to the correlator 1320. The control logic controls all the sequencing, the sampling of the center values into the holding flops 1532(1)-(3), and the multiplexing of the output using multiplexer 1533.

It should be noted that FIGS. 13, 14, and 15 includes specific values for the oversampling clock, the operating frequency of the correlator, the number of samples used after data alignment, and other values. These specific values may be other values as known by those of ordinary skill in the art. It should also be noted that other centering algorithms known by those of ordinary skill in the art may be used to obtain the center position of the chip.

In one embodiment, the correlator 1320 may be include the improved circuit of the embodiments described herein. Alternatively, the correlator 1320 may be conventional correlators as known by those of ordinary skill in the art. In effect by centering the data, the sampling rate for the correlators may be reduced, which may result in lower power and may allow hardware simplification of the correlator as described below.

The correlators may be large structures, especially for 64-bit and larger codes, in comparison to the data alignment block, which may be relatively small. Once the data has been centered based on the first correlation peak, the downstream correlation may be simplified in a few ways.

One way the downstream correlation function may be simplified is there may be less shifters being clocked, which may result in the system not using energy to shift values that are at known chip boundaries and prone to intersymbol errors; less shifters may be clocked, which means less power is being consumed; and less flops may be clocked, which creates less switching noise, which increases the receive sensitivity of the radio system.

Another way it may simply the downstream correlation is that it may use shifter components of the correlators differently. For example, some shifters may be reconfigured to operate as loops to decode CPM codes and some may be left to operate as shifters. This may allow extra cycles in order to compare against larger set of PN codes.

Another way it may simplify the system is that the effective oversampling rate may be made higher than the clocking rate of the correlators because of the elimination of the samples at the chip boundaries. It should be noted that these different simplifications may be combined with each other.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Embodiments of the present invention are well suited to performing various other operations or variations of the operations recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved solution and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
    loading a first code of an input chip stream into a first shift register;
    correlating the first code of the first shift register with a reference code; and
    loading a second code of the input chip stream into a second shift register while correlating the first code of the first shift register with the reference code, wherein the first shift register comprises a chain of K number of flip-flops, wherein K is a positive integer number, and wherein correlating the first code of the first shift register comprises:
        comparing outputs of the chain with the reference code, wherein the outputs of the chain comprise the first code;
        rotating chips of the first code within the chain, wherein rotating chips further comprises outputting a last chip of a last flip-flop to a first flip-flop of the chain; and
        comparing the rotated outputs of the chain with the reference code, wherein rotating and comparing the rotated outputs are performed K−1 times.

2. The method of claim 1, wherein the reference code is a pseudo-noise (PN) code.

3. The method of claim 1, wherein correlating the first code of the first shift register comprises:
    comparing the first code in the first shift register with the reference code;
    rotating the first code within the first shift register; and
    comparing the rotated first code in the first shift register with the reference code.

4. The method of claim 1, wherein loading the first code of the first shift register comprises:
    sampling a chip of the first code of the input chip stream;
    shifting the chip in the first shift register;
    sampling subsequent chips of the first code; and
    shifting the subsequent chips in the first shift register, wherein sampling subsequent chips is performed while shifting the chip in the first shift register.

5. The method of claim 1, wherein loading the first code into the first shift register comprises:
    sampling chips of the first code using the first flip-flop of the chain; and
    shifting chips into subsequent flip-flops of the chain, wherein after K sampled chips the first shift register comprises the first code.

6. The method of claim 1, further comprising comparing and rotating the second code with the reference code while loading a third code of the input chip stream into the first shift register.

7. The method of claim 6, further comprising comparing and rotating the third code with the reference code while loading a fourth code of the input chip stream into the second shift register.

8. An apparatus, comprising:
    a code storage device;
    a correlation multiplexer;
    a plurality of shift registers coupled to the correlation multiplexer;
    a selection circuit coupled to the plurality of shift registers; and
    a correlator coupled to the code storage device and correlation multiplexer, wherein the selection circuit comprises a plurality of multiplexers coupled to each of the plurality of shift registers, the plurality of multiplexers to select at least one of an input chip stream or an output of corresponding shift registers to be received by the corresponding shift register.

9. The apparatus of claim 8, wherein the code storage device is a pseudo-noise (PN) code register.

10. The apparatus of claim 8, wherein each of the plurality of shift registers comprise K number of flip-flops, wherein K is a positive integer, and wherein K is equal to a code size of an incoming chip stream.

11. The apparatus of claim 8, wherein the selection circuit further comprises a multiplexer coupled to the plurality of multiplexers, the multiplexer to select one or more multiplexers of the plurality of multiplexers to receive the input chip stream.

12. The apparatus of claim 8, further comprising a control block coupled to the selection circuit, the control block to select at least one of a load operation and a correlation operation for each of the plurality of shift registers.

13. The apparatus of claim 8, further comprising a control block coupled to the selection circuit, the control block to select a load operation for each of the plurality of shift registers.

14. The apparatus of claim 8, further comprising a peak detector coupled to the output of the correlator, the peak detector to output decoded CPM data, and the peak detector to detect a timing of a correlation peak.

15. The apparatus of claim 8, wherein the plurality of shift registers comprises six shift registers, three of the six shift registers to be loaded with the incoming chip stream and three of the six shift registers to be correlated with the reference code.

* * * * *